(12) United States Patent
Nakanishi et al.

(10) Patent No.: US 8,765,219 B2
(45) Date of Patent: Jul. 1, 2014

(54) METHOD OF MAKING A METAL-RESIN COMPOSITE

(75) Inventors: Hironobu Nakanishi, Kobe (JP); Akio Sugimoto, Kobe (JP)

(73) Assignee: Kobe Steel, Ltd., Kobe-shi, Hyogo (JP)

( * ) Notice: Subject to any disclaimer, the term of this patent is extended or adjusted under 35 U.S.C. 154(b) by 1583 days.

(21) Appl. No.: 12/149,507

(22) Filed: May 2, 2008

(65) Prior Publication Data

US 2008/0292900 A1    Nov. 27, 2008

(30) Foreign Application Priority Data

May 24, 2007    (JP) ................................ 2007-137612

(51) Int. Cl.
*B05D 7/22*        (2006.01)
(52) U.S. Cl.
USPC .......................................... 427/230; 427/247
(58) Field of Classification Search
USPC ................... 427/230–239, 207.1, 243, 247
See application file for complete search history.

(56) References Cited

U.S. PATENT DOCUMENTS

| | | | | |
|---|---|---|---|---|
| 3,366,718 A | * | 1/1968 | Hiroshi Komada | 264/45.7 |
| 3,491,171 A | * | 1/1970 | French | 264/46.5 |
| 3,492,029 A | * | 1/1970 | French et al. | 285/47 |
| 3,801,140 A | * | 4/1974 | Keller | 285/47 |
| 6,171,533 B1 | * | 1/2001 | Adams et al. | 264/45.2 |
| 6,263,635 B1 | | 7/2001 | Czaplicki | |
| 6,305,136 B1 | | 10/2001 | Hopton et al. | |
| 2001/0042353 A1 | | 11/2001 | Honda et al. | |
| 2007/0074778 A1 | | 4/2007 | Berti et al. | |
| 2008/0241576 A1 | | 10/2008 | Le Gall et al. | |

FOREIGN PATENT DOCUMENTS

| | | | |
|---|---|---|---|
| GB | 1065711 | | 4/1967 |
| GB | 1 268 280 | | 3/1972 |
| JP | 02-206537 A | | 8/1990 |
| JP | 03-281328 A | | 12/1991 |
| JP | 05-169574 A | * | 7/1993 |
| JP | 07-117094 | | 5/1995 |
| JP | 2002-356574 A | | 12/2002 |
| JP | 2002-356576 A | * | 12/2002 |
| WO | WO 98/21060 | | 11/1997 |
| WO | WO 2005/075189 A2 | * | 8/2005 |
| WO | WO 2005075189 A2 | | 8/2005 |

OTHER PUBLICATIONS

Office Action from Korean Patent Office mailed Mar. 31, 2010, in Korean and English.
European Search Report mailed Sep. 15, 2010, in English.
Office Action, issued from Japanese Patent Office, in corresponding Japanese Patent Application No. 2008-122993, dated Apr. 3, 2012, pp. 1-9.

* cited by examiner

*Primary Examiner* — William Phillip Fletcher, III
(74) *Attorney, Agent, or Firm* — Juan Carlos A. Marquez; Morris, Manning & Martin, LLP

(57) ABSTRACT

A method for producing a metal-resin composite includes a coating step, an assembling step, and a heating step. The coating step coats at least part of the outer periphery of a solid metal first member with a foaming resin and a non-foaming resin. The assembling step disposes the first member within a hollow metal second member. The heating step heats an assembly of the second member within which the first member coated with the foaming resin and the non-foaming resin with the axes of the first member and the second member extending in the horizontal direction, and thus foams the foaming resin between the first member and the second member.

12 Claims, 18 Drawing Sheets

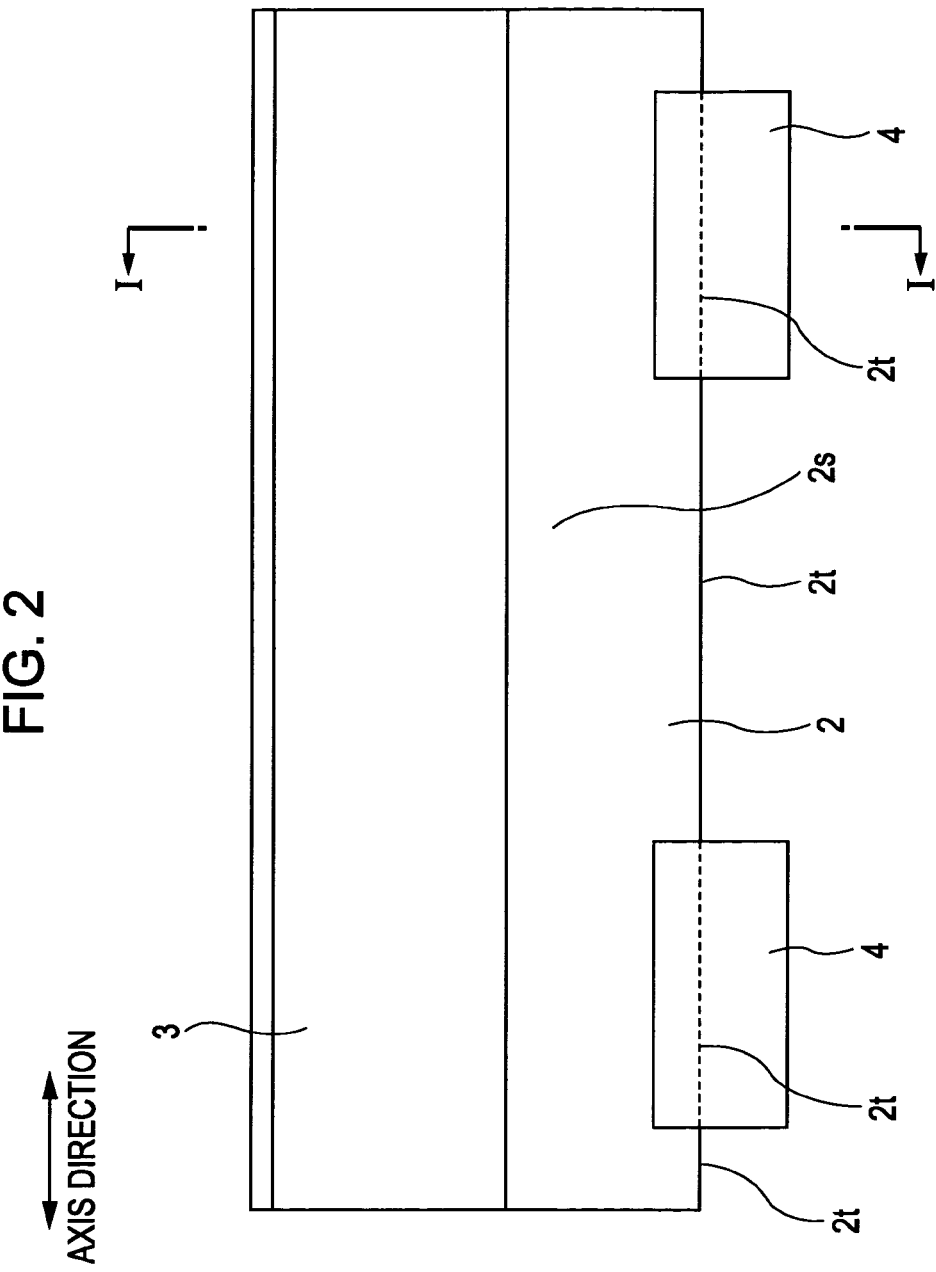

AXIS DIRECTION

AXIS DIRECTION

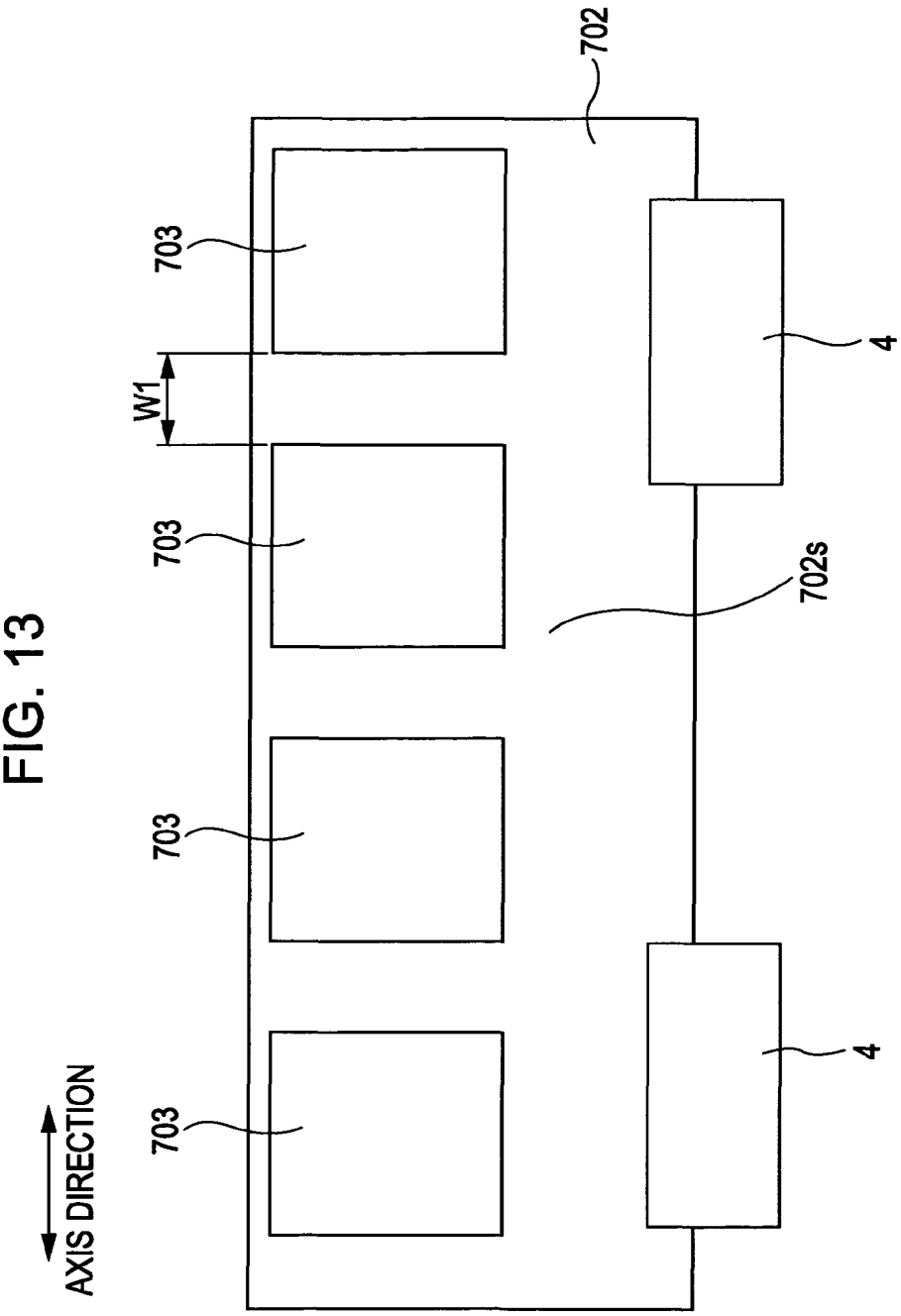

AXIS DIRECTION ⊗⊙

AXIS DIRECTION ⊗⊙

METHOD OF MAKING A METAL-RESIN COMPOSITE

BACKGROUND OF THE INVENTION

1. Field of the Invention

The present invention relates to a metal-resin composite including a hollow or solid metal internal member, a hollow metal external member within which the internal member is disposed, and an intermediate layer disposed between the internal member and the external member, and to a method for producing the metal-resin composite.

2. Description of the Related Art

PCT Japanese Translation Patent Publication No. 2001-507647 discloses a known automotive body structure. The automotive body structure has a tube-in-tube structure including an internal tube whose surface is coated with a resin-based single layer, and an external shell. This structure allows the beam to have an extremely high stiffness without increasing the weight. The resin-based layer contains a bubble forming agent that may contain either a chemical foaming agent or a physical foaming agent. When the matrix of the resin-based layer is a thermally curable or thermally expanding resin, the resin-based layer is cured and/or expanded by heating.

For example, an automotive door beam may use a structure including a hollow or solid metal member (hereinafter referred to as first member) disposed within a hollow metal member (hereinafter referred to as second member) made of, for example, steel. The first member is intended for reinforcement.

A foaming resin is foamed during heating (and immediately after heating) to produce a force expanding the entire volume of the resin. After the completion of heating, however, a stage is present where the foaming is stopped and the resin has not yet been cured completely. If a metal-resin composite including the first member and the second member with a resin layer in between is produced, the production process is generally performed in such a manner that the first member and the second member are assembled with their axes extending in the horizontal direction, and the internal first member, during heating, is supported by the expansion force of the entire resin without falling into the resin layer. However, in the above-mentioned stage after heating, the first member falls and is displaced from the intended position because of the softness of the resin layer and the contraction of foam gas. It is however important to accurately position the first member from the viewpoint of strength.

When grooved (not hollow) members are combined with each other and the space between the two members is filled with a resin, as disclosed in PCT Japanese Translation Patent Publication No. 2001-507647, supporting brims provided to both members help align the upper member with the lower member, thus preventing the problem that the upper member falls into the resin. On the other hand, when a metal-resin composite including a hollow or solid first member and a hollow second member with a resin intermediate layer in between is produced, the production process is performed in such a manner that an assemble of the first member and the second member is laid with their exes extending in the horizontal direction, and the first member is not supported by any member. Consequently, the above problem is liable to occur that the first member falls into the soft resin under its own weight in the stage before the resin is cured.

In this instance, the resin may not completely fill a region above the first member, and, thus, a gap or a low-density foamed portion may be formed. The gap or low-density portion causes an insufficient strength of the foamed resin requiring a reinforcing ability.

Also, use of additional positioning members for supporting the first member at both ends is not desirable because the number of parts is increased. Also, if both ends of the first member are closed, such positioning member cannot be used.

SUMMARY OF THE INVENTION

Accordingly, an object of the invention is to provide a method for producing a metal-resin composite including simple step through which an internal member is disposed in a desired position, and to a metal-resin composite including an internal member disposed in a desired position.

According to an aspect of the invention, a method for producing a metal-resin composite is provided which includes a coating step, an assembling step, and a heating step. In the coating step, at least part of the outer periphery of a hollow or solid metal first member is coated with a foaming resin and a non-foaming material. The coating step is performed through at least one stage. In an assembling step, the first member is disposed within a hollow metal second member. An assembly of the second member within which the first member coated with the foaming resin and the non-foaming material is disposed is heated with the axes of the first member and the second member extending in the horizontal direction. The foaming resin is thus foamed between the first member and the second member.

Consequently, the space between the second member and the first member is filled with the foamed resin produced foaming the foaming resin and the non-foaming material through the heating step. In this instance, the non-foaming material acts as a spacer to prevent the first member from falling into the soft resin immediately after heating, and thus coming into contact with the second member. The second member and the first member can thus be maintained at a desired interval. The internal member, or the first member, can be disposed in a desired position through simple steps, and the foamed resin exhibits a reinforcing ability as intended.

The foaming resin used herein contains a foaming agent in a synthetic matrix resin, and is foamed and cured by heating. The non-foaming resin used herein does not contain a foaming agent in a synthetic matrix resin.

The coating step may be performed by a single stage at one time, or through a plurality of stages. The three steps: coating step, assembling step, and heating step can be performed, for example, in the following orders:

(1) coating step, assembling step, and heating step;
(2) assembling step, coating step, and heating step; and
(3) first-stage coating step, assembling step, second-stage coating step, and heating step.

Another step may be performed before, after, or between those steps.

Preferably, the first member is made of lightweight aluminum, for example, for use of the metal-resin composite as a door beam. Door beams are required to be strong and light, and a steel first member increases the weight of the resulting metal-resin composite.

The coating step may include not only applying the non-foaming material, apart from the first member, to the first member, but also integrally forming the first member and the non-foaming material by, for example, extruder.

"At least part of the outer periphery of the first member is coated with a foaming resin and a non-foaming material" means a state in which the foaming resin and the non-foaming material are disposed on a portion corresponding to at least part of the outer periphery of the first member in the completed metal-resin composite. The coating step, therefore, includes disposing the foaming resin and the non-foaming material in the space between the first member and the second member of the metal-resin composite. In other words, the coating step may include: (i) disposing the non-forming material, apart from the second member, on the inner periphery of the second member; (ii) integrally forming the second member and the non-foaming material by, for example, extrusion; or (iii) disposing the foaming resin on the inner periphery of the second member. Also, the coating step may include disposing the non-foaming material on one of the first member and the second member and disposing the foaming resin on the other.

Preferably, the heating step may be performed in a state in which at least part of the non-foaming material is sandwiched between the lowermost position of the outer periphery of the first member and the lowermost position of the inner periphery of the second member in the vertical direction. Hence, the non-foaming material supports the internal member at a position from below, in cross sectional view. Thus, the internal member can be disposed in a desired position with a small amount of non-foaming material through simple steps.

At least part of the outer periphery of the first member may be coated with an adhesive layer, and the coating step is performed so that the adhesive layer is disposed between the first member and the foaming resin. Thus, the adhesion between the first member and the intermediate layer is enhanced, and it becomes difficult to form a gap between the first member and the intermediate layer.

The coating step may further include the sub step of forming an adhesive layer on the surface of the foaming resin coating the first member. Thus, the adhesion between the second member and the intermediate layer is enhanced, and it becomes difficult to form a gap between the second member and the intermediate layer.

The method may further include the step of forming an adhesive layer to coat at least part of the inner periphery of the second member. Thus, the adhesion between the second member and the intermediate layer is enhanced, and it becomes difficult to form a gap between the second member and the intermediate layer.

In this instance, the method includes the adhesive layer-forming step. The coating step, the assembling step, the heating step, and the adhesive layer-forming step are performed, for example, in the following orders:
(1) adhesive layer-forming step, coating step, assembling step, and heating step;
(2) coating step, adhesive layer-forming step, assembling step, and heating step;
(3) adhesive layer-forming step, assembling step, coating step, and heating step;
(4) assembling step, adhesive layer-forming step, coating step, and heating step;
(5) adhesive layer-forming step, first-stage coating step, assembling step, second-stage coating step, and heating step;
(6) first-stage coating step, adhesive layer-forming step, assembling step, second-stage coating step, and heating step; and
(7) first-stage coating step, assembling step, adhesive layer-forming step, second-stage coating step, and heating step.

Another step may be performed before, after, or between those steps.

The foaming resin may contain a foamable resin, and the foamable resin is foamed in the heating step. Thus, the first member can be reliably prevented from directly coming into contact with the second member.

The non-foaming material may be a non-foaming resin. As describe above, the first member and the second member are made of a metal. If an aluminum first member and a steel second member are used with continuity between the aluminum first member and the steel second member, galvanic corrosion occurs. If the non-foaming material is made of a metal, the first member and the second member can be brought into continuity. By disposing the non-foaming resin between the first member and the second member, the continuity between these members can be prevented, and, thus, the galvanic corrosion can be prevented between the first member and the second member.

The first member may have a round hollow or solid shape, and the second member may have a round hollow shape. By assembling the first ember and the second member so as to aligning the axes of the first member and the second member, the resulting metal-resin composite has a directionally independent strength.

The first member may have a hollow or solid prismatic shape, and the second member has a hollow prismatic shape. The first member and the second member having such simple shapes are easy to form.

The foaming resin may contain any one of polyolefin, polyurethane, and polystyrene. These resins are considered to be most suitable from the viewpoint of the balance with the heating-foaming temperature of the chemical foaming agent, and any one of these resins can foam favorably.

The foaming resin may contain an acid-modified polyolefin. The foaming resin containing an acid-modified polyolefin has a high affinity for metals. Consequently, the adhesion of the foamed resin to the first member and the second member is increased to prevent displacement.

Examples of the acid-modified polyolefin include, but not limited to, polymers oxidized to introduce an acid group into the main chain or the side chain, and copolymers of an olefin monomer and a monomer having a small amount of an acid group, such as acrylic acid, methacrylic acid, or maleic anhydride.

The foaming resin may contain organo-modified inorganic flake powder. The foaming resin containing organo-modified inorganic flake powder allows fine foaming and results in a strong foamed resin layer. Consequently, the adhesive strength between the foamed resin and the first and second members is increased to prevent displacement.

To introduce a functional group between layers of inorganic flake powder by modification is referred to as organo-modification of inorganic flake powder. Examples of the organo-modifying agent used to introduce a functional group include primary to quaternary ammonium salts, quaternary phosphonium salts, hexylammonium ion, octylammonium ion, 2-ethylhexylammonium ion, dodecylammonium ion, laurylammonium ion, octadecylammonium ion, dioctyldimethylammonium ion, trioctylammonium ion, dioctadecyldimethylammonium ion, and trioctadecylammonium ion. By the organo-modification using such an agent, the agent, such as quaternary ammonium salt, is introduced and substituted for metal cations between layers of the inorganic flake powder. Thus, delamination is promoted and inorganic powder in a form of fine flakes is diffused into the entire matrix resin. Thus, a gas barrier-effect can be produced effectively.

The inorganic flake powder has a structure in which crystalline flakes overlap one another, and the crystalline flakes are separated and diffused in a melted thermoplastic resin layer. Examples of such inorganic flake powder include viscous minerals such as montmorillonite (bentonite), clay, heidellite, nontronite, saponite, beidellite, hectorite, and stevensite, and natural or expanding mica such as vermiculite and halloysite. These materials may be natural or synthetic.

According to another aspect of the invention, a metal-resin composite is provided which includes a hollow or solid metal first member, a hollow metal second member within which the first member is disposed, and an intermediate layer between the first member and the second member. The intermediate layer is formed by heating an assembly of the second member within which the first member at least partially coated with a foaming resin and a non-foaming material is disposed with the axes of the first member and the second member extending in the horizontal direction and thus foaming the foaming resin between the first member and the second member. In the metal-resin composite having such a simple structure, the internal member is disposed in a desired position.

The non-foaming material may be a non-foaming resin. The non-foaming resin can prevent the galvanic corrosion of the first member and the second member.

BRIEF DESCRIPTION OF THE DRAWINGS

FIG. 2 is a schematic side view taken in the direction of arrow II in FIG. 1A (omitting the external second member);

FIG. 13 is a schematic side view of the unheated assembly of a metal-resin composite according to a seventh modification of the embodiment;

FIG. 14A shows a portion of the foaming resin before heating; and FIG. 14B shows the portion of the foaming resin after heating;

DESCRIPTION OF THE PREFERRED EMBODIMENTS

A preferred embodiment of the invention will now be described with reference to the drawings. The embodiment will illustrate a metal-resin composite used for an automotive door beam.

Figure 1A:
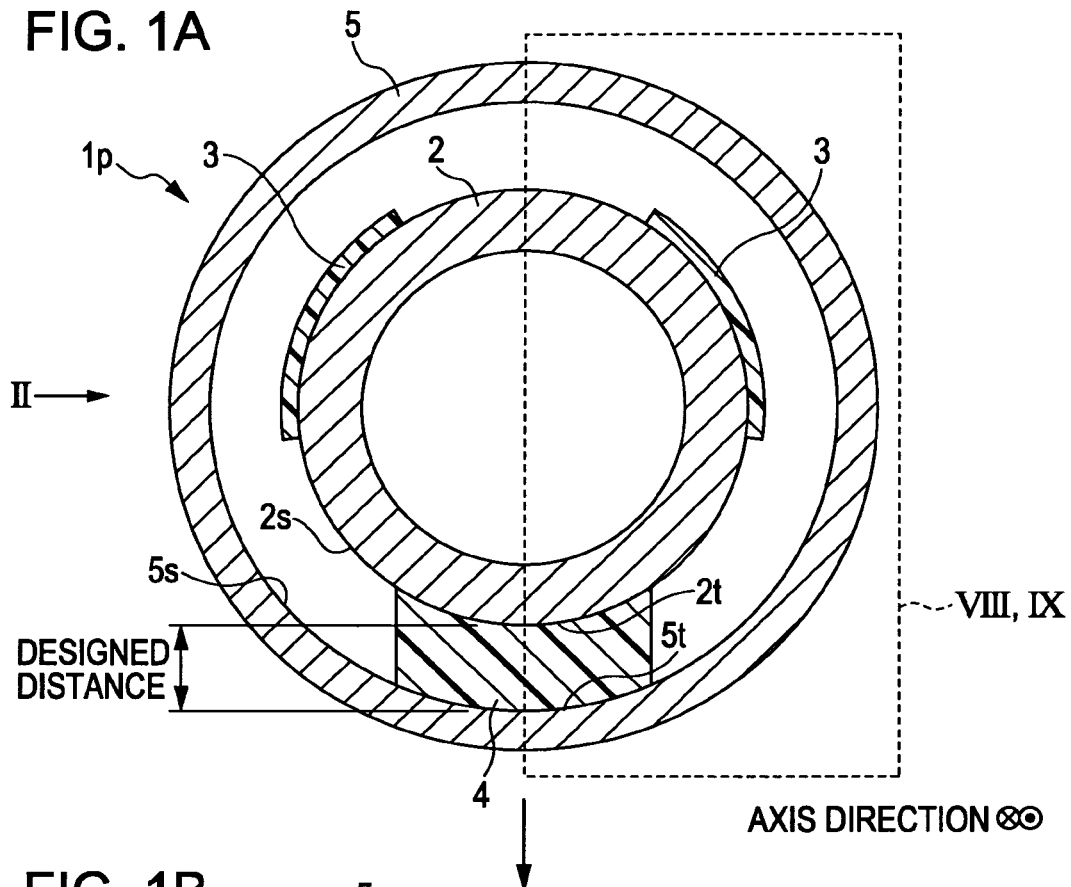
FIG. 1A is a schematic cross-sectional view taken in the diameter direction of an unheated assembly of a metal-resin composite according to an embodiment of the invention.
Figure 1B:
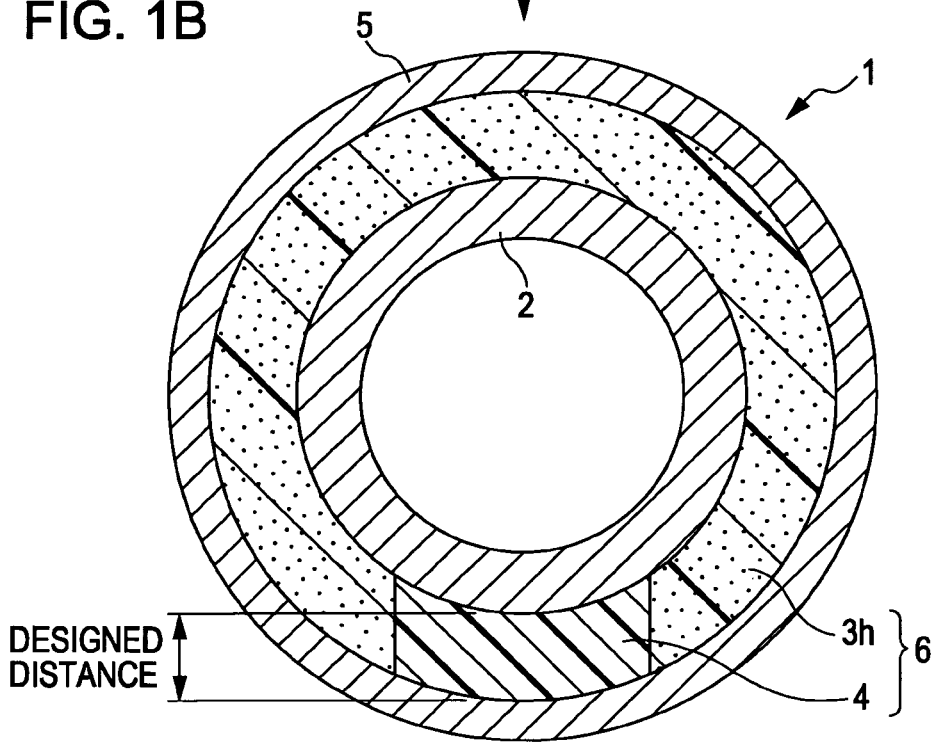
FIG. 1B is a view similar to FIG. 1A of the metal-resin composite after heating.
Figure 3:
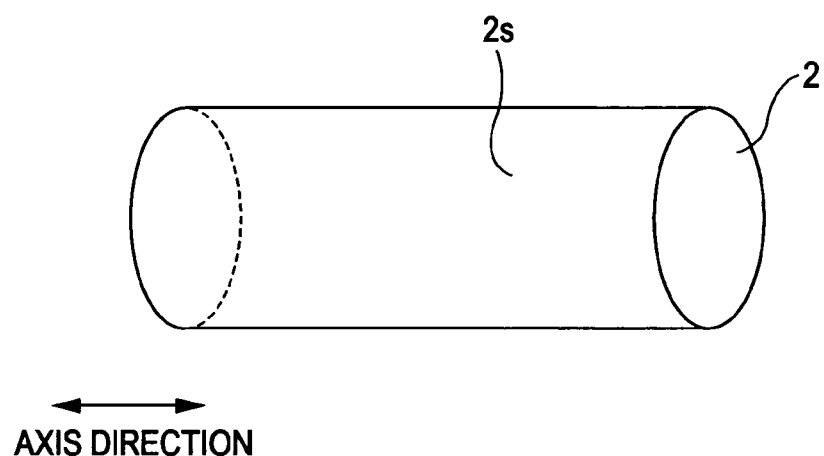
FIG. 3 is a schematic perspective view of an internal first member shown in FIGS. 1A and 1B.
Figure 4:
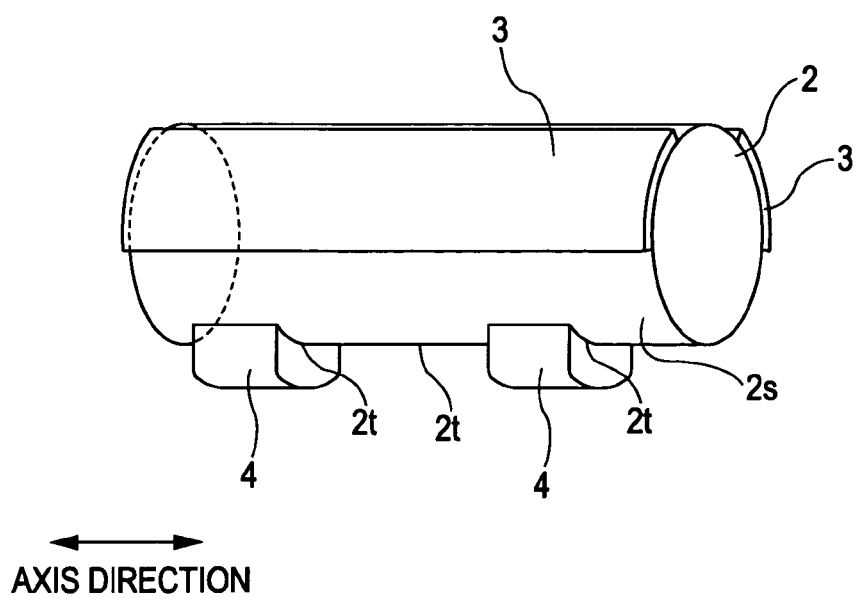
FIG. 4 is a schematic perspective view of the first member after a coating step of a production method of a metal-resin composite according to an embodiment of the invention.
Figure 5:
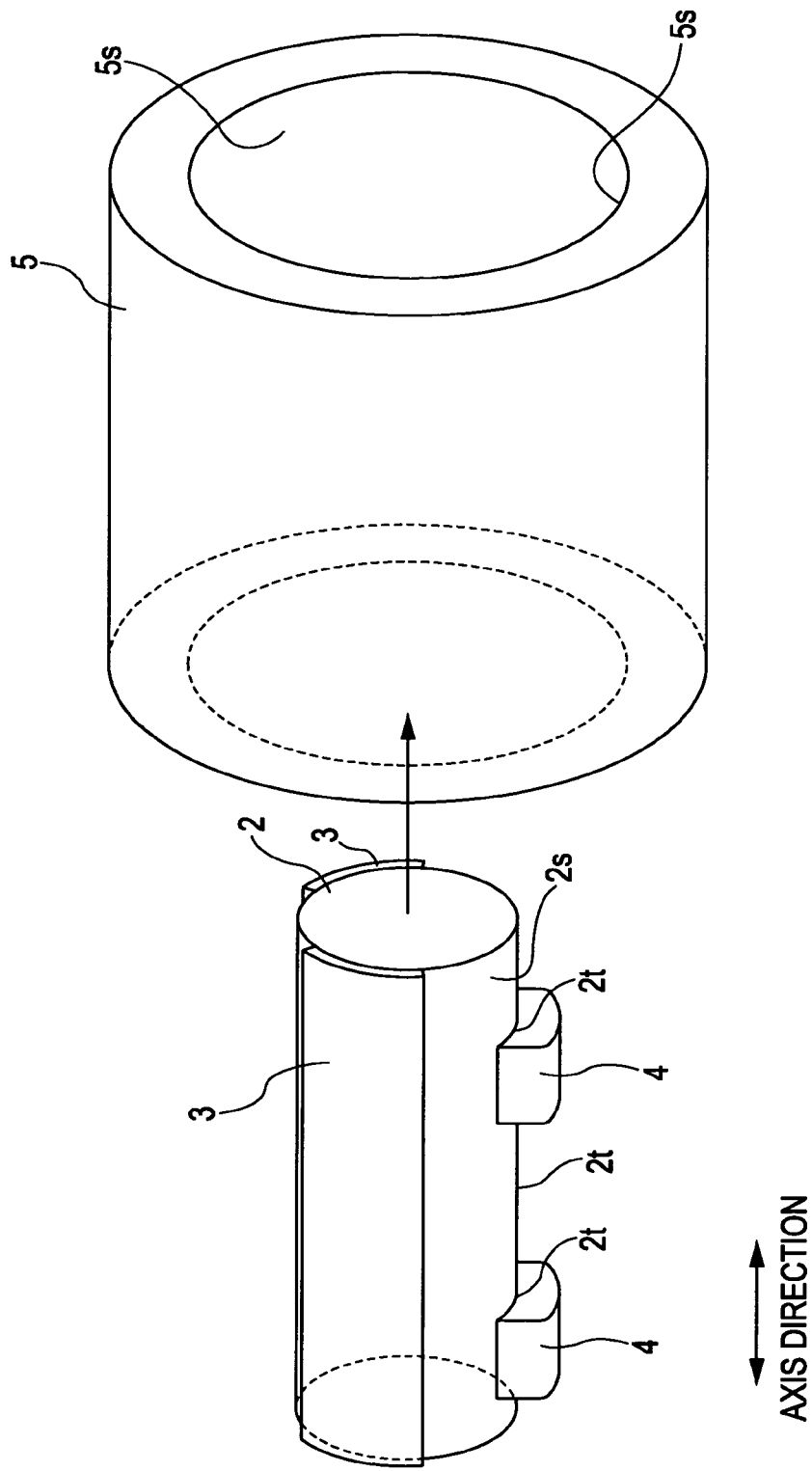
FIG. 5 is a schematic perspective view showing an assembling step of the metal-resin composite production method.
Figure 6:
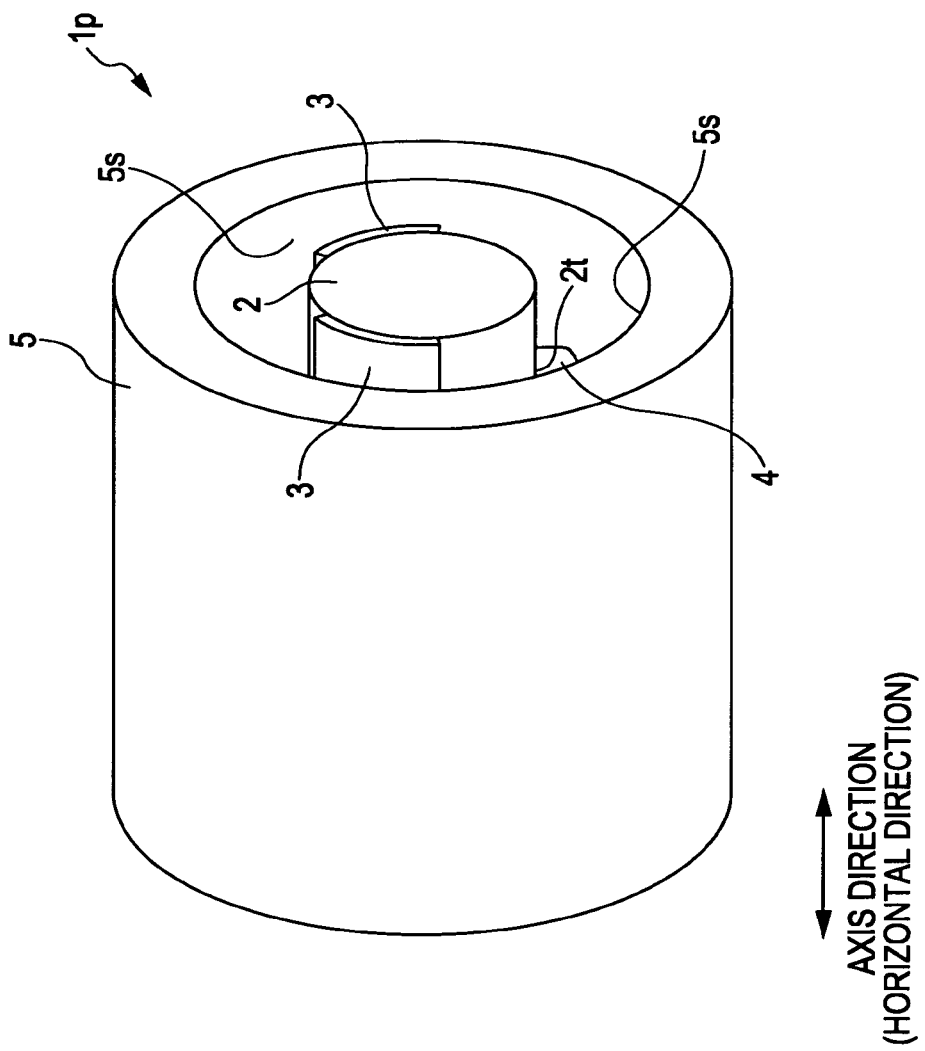
FIG. 6 is a schematic perspective view of a state after the assembling step of the metal-resin composite production method.
Figure 7:
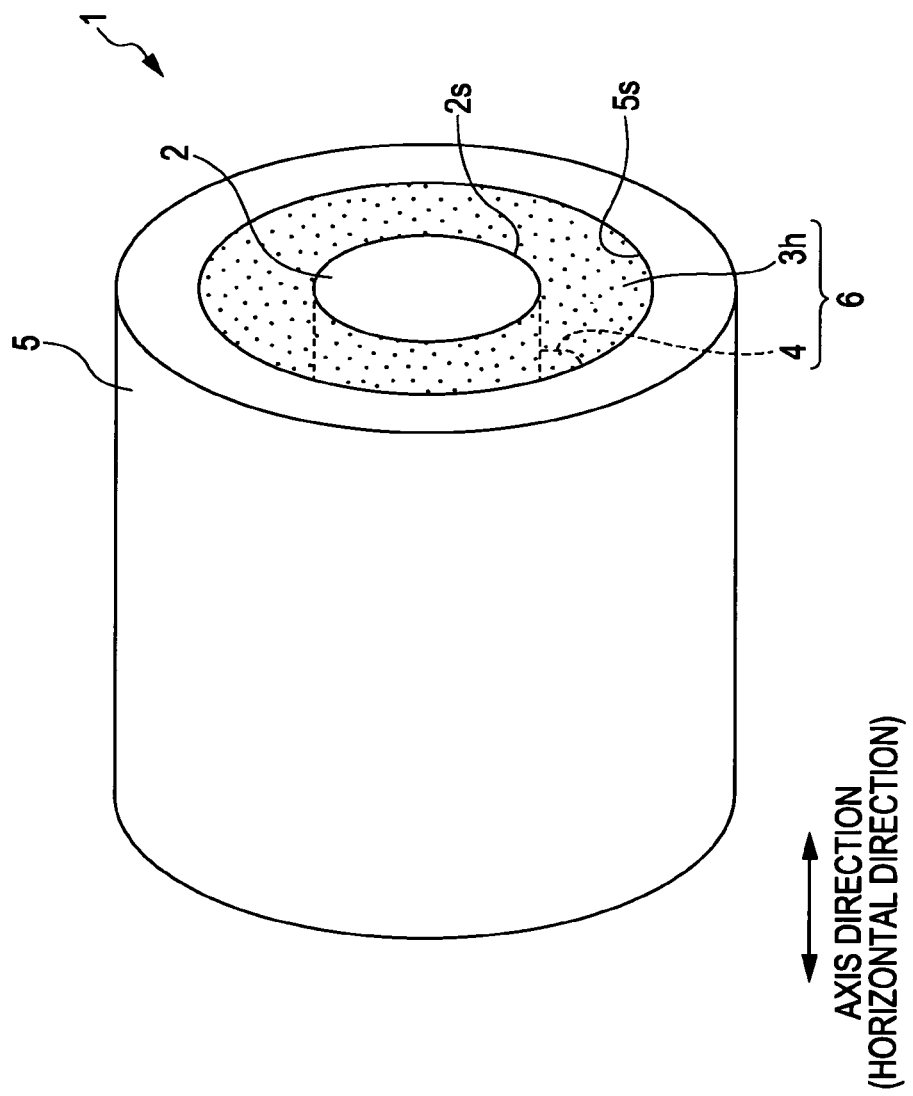
FIG. 7 is a schematic perspective view of the metal-resin composite after a heating step of the metal-resin composite production method.

FIGS. 1A and 1B show a metal-resin composite before and after heating, respectively: FIG. 1A is a schematic cross-sectional view taken in the diameter direction of the unheated assembly of the metal-resin composite; and FIG. 1B is a view similar to FIG. 1A of the metal-resin composite after heating. FIG. 2 is a schematic side view taken in the direction of arrow II in FIG. 1A, omitting the external second member. The cross sections shown in FIGS. 1A and 1B are taken along line I-I in FIG. 2. FIG. 3 is a schematic perspective view of an internal first member shown in FIG. 1. FIG. 4 is a schematic perspective view of the first member after a coating step of a production method of the metal-resin composite according to the embodiment. FIG. 5 is a schematic perspective view showing an assembling step in the metal-resin composite production method according to the present embodiment. FIG. 6 is a schematic perspective view of a state after the assembling step of the metal-resin composite production method. FIG. 7 is schematic perspective view of the metal-resin composite after a heating step of the metal-resin composite production method.

Entire Structure

The entire structure of the metal-resin composite according to the embodiment will first be described below. The metal-resin composite 1 of the embodiment includes an internal first member 2, an external second member 5, and an intermediate layer 6 filling the space between the first member 2 and the second member 5, as shown in FIGS. 1B and 7. The first member 2 is made of a metal and has a solid bar shape, and the second member 5 is also made of a metal and has a tubular or hollow shape. The first member 2 is disposed within the second member 5 and the intermediate layer 6 fills the space outside the first member 2 and inside the second member 5.

Automotive door beams are required to be lightweight and strong. In order to satisfy these requirements, the first member 2 is disposed within the second member 5 so that the metal-resin composite 1 has a high shear strength and a high flexural strength. In addition, the intermediate layer, which is an insulator, reinforces the entire structure of the metal-resin composite 1 and prevents the first member 2 and the second member 5 from coming into contact with each other to cause galvanic corrosion. Essential components of the metal-resin composite will now be described in detail.

First Member

The first member 2 is a reinforcing member disposed within the second member 5 (see FIG. 3) and is a solid metal bar. More specifically, the first member 2 is made of aluminum and is hence lightweight. Use of such a light metal as the reinforcing member results in a metal-resin composite satisfying the requirements of being light and strong. The first member 2 is desirably made of a light metal, but the material of the first member is not limited to aluminum, and may be copper, steel, or stainless steel.

Second Member

The second member 5 is made of a metal and has a hollow shape within which the first member 2 can be disposed, as shown in FIG. 5. More specifically, the second member 5 is made of steel in the present embodiment, and may be made of any metal, such as copper, aluminum, or stainless steel, as long as it has a high strength.

Intermediate Layer

The intermediate layer 6 is disposed so as to fill the space between the first member 2 and the second member 5, as described above. The intermediate layer 6 is formed by heating an assembly of the second member 5 within which the first member 2 at least partially coated with a foaming resin and a non-foaming resin is disposed with the axes of the first member 2 and the second member 5 extending in the horizontal direction and thus foaming the foaming resin between the first member 2 and the second member 5, as will be described in detail in the description of the production method. The intermediate layer 6 thus includes the foamed resin and the non-foaming resin (non-forming material), as will be described below.

At least one of the outer periphery of the first member and the inner periphery of the second member may be surface-treated. Exemplary surface treatments include chemical conversion treatment, anodic oxidation, and silane coupling. Such surface treatment performed on the first member and the second member prevents corrosion. The characteristics and the effects of these surface treatments will be described below.

Chemical conversion treatment chemically forms a non-metal chemical coating on a surface. For example, the chemical conversion treatment may use a chromium compound, such as green chromate or yellow chromate, or a non-chromium compound, such as zinc phosphate. The chemical conversion treatment of the first member and the second member enhances the corrosion resistance and the affinity for the coating material.

Anodic oxidation artificially forms an oxide film by an electrochemical method using the first member or the second member as the anode. In the present embodiment, a conventional anodic oxidation may be applied. The anodic oxidation of the first member and the second member enhances the corrosion resistance and the abrasion resistance.

Silane coupling treatment forms a silane coupling layer on a surface using a hydrolytically condensing organic silicon compound having a reactive group (or a functional group). Exemplary silane coupling agents include halogen-containing silane coupling agents, epoxy-containing silane coupling agents such as 3-glycidyloxypropyltrimethoxysilane, amino group-containing silane coupling agents, mercapto group-containing silane coupling agents, vinyl group-containing silane coupling agents, and (meth)acryloyl group-containing silane couplings. Silane coupling treatment of the first member and the second member enhances the adhesion, the corrosion resistance, and physical strength.

Production Method

A method for producing the metal-resin composite 1 according to the present embodiment will now be described. First, a first member 2 is prepared. The outer periphery 2s of the first member 2 is not coated in the original state.

Coating Step

The outer periphery 2s of the first member 2 is partially coated with the foaming resin 3 and the non-foaming resin 4 (coating step), as shown in FIG. 4. FIG. 4 shows the state of the first member 2 after the coating step.

More specifically, in the coating step of the present embodiment, the foaming resin 3 is separately applied in two regions on the surface of the first member 2. The two portions of the foaming resin 3 each have substantially the same length as the first member 2 and are disposed along the axis direction of the first member 2, as shown in FIGS. 2 and 4. The non-foaming resin 4 is separately applied in two regions on the surface of the first member 2. The two portions of the non-foaming resin 4 each have a smaller length than half of the length of the first member 2, and are disposed close to the ends in the axis direction of the first member 2. The two portions of the non-foaming resin are aligned on a line in such a manner that one of the two portions covers the other when viewed from above in FIG. 2. The two portions of the foaming resin 3 and the non-foaming resin 4 are arranged on the outer periphery 2s at intervals of about 120 degrees in a state in which the non-foaming resin 4 is located at the lowermost position with the two portions of the foaming resin 3 located at upper positions in cross sectional view of the first member 2, as shown in FIGS. 1A and 4. In the description below, the two portions of the foaming resin 3 are simply referred to as the foaming resin 3 and the two portions of the non-foaming resin 4 are simply referred to as the non-foaming resin 4, unless otherwise specified.

The non-foaming resin 4 applied in the coating step has a portion having a thickness equal to the designed distance between the second member 5 and the first member 2 of the completed metal-resin composite 1 (see FIG. 1A). More specifically, at least part of the thickness of the non-foaming resin 4 in the coating step is set equal to the designed, intended distance between the second member 5 and the first member 2 in the region where the non-foaming resin 4 is disposed. Hence, the non-foaming resin 4 is intended to prevent the first member 2 from being displaced and to dispose the first member 2 securely in a desired position.

The foaming resin used herein contains a foaming agent in a synthetic matrix resin, and is foamed and cured by heating. The non-foaming resin used herein does not contain a foaming agent in a synthetic matrix resin. Preferred examples of the resin component of the base resin include, but not limited to, polyolefin resins, polystyrene resins, polyurethane resins, polyester resins, ethylene-vinyl acetate copolymer resins, polyvinyl chloride resins, and rubber. Among those particularly preferred are polyolefin resins. Since polyolefin resins have high stiffness, use of a polyolefin resin increases the stiffness of the resulting metal-resin composite. Particularly preferably, polyolefin, polyurethane, or polystyrene is used as the matrix resin of the foaming resin. These synthetic resins are considered to be most suitable from the viewpoint of the balance with the heating-foaming temperature of the chemical foaming agent, and any one of these resins can foam favorably.

The foaming agent contained in the foaming resin may be an organic foaming agent or an inorganic foaming agent. The organic foaming agent may contain an azo compound, a nitroso compound, or a sulfonylhydrazide compound. Exemplary organic foaming agent components include azodicarbonamide, barium azodicarboxylate, azobisisobutyronitrile, N,N'-dinitrosopentamethylenetetramine, p-toluenesulfonylhydrazide, p,p'-oxybis(benzenesulfonylhydrazide), hydrazodicarbonamide, diphenylsulfone-3,3-disulfone hydrazide, p-toluenesulfonyl semicarbazide, trihydrazinotriazine, and biurea. The inorganic foaming agent may contain sodium carbonate or zinc carbonate, or thermally expanding microcapsules. Preferably, the foaming agent component is foamed by heating to 120° C. or more, and more preferably to 150° C. or more. The above-listed foaming agent components may be used singly or in combination. The content of the foaming agent component in the foaming resin is preferably in the range of 1% to 10% by mass, and more preferably in the range of 2% to 5% by mass.

Resin coating may be performed by various techniques. If an adhesive layer is provided between a metal member and the foaming resin (as will be described in a modification), the adhesive layer and the foaming resin may be applied from an extruder. The foaming resin may be applied on the first member in a spiral manner by rotating a heating roller around which the resin sheet is wound with the axes of the first member and heating roller extending in the same direction, while the first member is rotated in the circumferential direction and moved in the axis direction. Alternatively, the foaming resin may be applied along the axis direction by moving the first member in the axis direction, without rotation, on the periphery of the heating roller, with the axes of the heating roller and first member perpendicular to each other (technique used in the present embodiment).

In the present embodiment, part (not the entire) of the outer periphery 2s of the first member 2 is coated with the foaming resin 3 and the non-foaming resin 4, as shown in FIGS. 1A and 4. The outer periphery can be at least partially coated with the foaming resin and the non-foaming resin without limiting the state of the coatings to the above. For example, different regions of the outer periphery of the first member may be coated with the foaming resin and the non-foaming resin, or the entirety of the outer periphery may be coated with the foaming resin and the non-foaming resin.

Assembling Step

After the coating step, the first member 2 partially coated with the foaming resin 3 and the non-foaming resin 4 is disposed within the second member 5 (assembling step) with the axes of the first member 2 and the second member 5 extending in the horizontal direction, as shown in FIG. 6. FIG. 5 shows the first member 2 and the second member 5 before the assembling step, and FIG. 6 shows those after the assembling step. The assembly of the first member 2 (having the foaming resin 3 and the non-foaming resin 4) and second member 5 that has been prepared through the coating step and the assembling step and that is ready to be subjected to heating is referred to as unheated assembly 1p (see FIGS. 1A and 6).

Although in the present embodiment, the first member 2 and the second member 5 are assembled with their axes extending in the horizontal direction, such positions are required only for heating. The first member 2 and the second member 5 are not necessarily assembled with their axes extending in the horizontal direction. The first member 2 and the second member 5 may be assembled with their axes extending in the vertical direction.

Heating Step

Then, the unheated assembly 1p is heated with the axes of the first member 2 and the second member 5 extending in the horizontal direction so that the foaming resin 3 is foamed between the first member 2 and the second member 5 (heating step). In this instance, the axes of the first member 2 and the second member 5 are oriented in the horizontal direction in order to secure the first member 2 and the second member 5 stably. By heating the assembly of the first member 2 and the second member in this state, the foaming resin 3 is foams to expand and harden, thus filling the space between the first member 2 and the second member 5 to form the intermediate layer 6. The metal-resin composite 1 is thus completed. FIG. 7 shows the metal-resin composite 1 after the heating step. In the heating step, the unheated assembly 1p is heated so as to heat at least the foaming resin 3. The resulting intermediate layer 6 includes foamed rein 3h formed by foaming the foaming resin 3 and the non-foaming resin (non-foaming material) 4, as shown in FIGS. 1B and 7.

Each length, in the axis direction, of the two portions of the non-foaming resin 4 is smaller than half of the length of the first member 2, as described above. Hence, the total length of the non-foaming resin 4 (sum of the lengths of the two non-foaming resin portions) is smaller than the length of the first member 2, and thus the non-foaming resin 4 partially coats the length of the first member 2. Before heating, the non-foaming resin 4 is sandwiched in the vertical direction between the lowermost position of the outer periphery 2t of the first member 2 and the lowermost position of the inner periphery 5t of the second member 5 (see FIGS. 1A, 2, 4, 5, and 6). The unheated assembly 1p is heated in this state in the heating step.

In the heating step of the present embodiment, the non-foaming resin 4 is sandwiched at the lowermost position between the outer periphery 2t of the first member 2 and the inner periphery 5t of the second member 5. The heating step can be performed in a state in which at least part of the non-foaming resin is sandwiched in the vertical direction at the lowermost position between the outer periphery of the first member and the inner periphery of the second member without limiting to the state of the present embodiment. For example, the width (length in the circumferential direction) of the non-foaming resin may be extended to be larger than that of the non-foaming resin of the present embodiment. In this instance, the extension of the width is not sandwiched in the vertical direction at the lowermost position; hence, part of the non-foaming resin is sandwiched in the vertical direction, while the entire width of the non-foaming resin 4 is sandwiched in the vertical direction between the inner periphery of the second member and the outer periphery of the first member in the present embodiment. Alternatively, the length (in the axis direction) of the non-foaming resin may be equal to or larger than that of the first member. In this instance, the non-foaming resin is sandwiched in the vertical direction at the lowermost position between the entire length of the first member and the entire length of second member, while the non-foaming resin 4 is sandwiched in the vertical direction at the lowermost position between part of the length of the first member 2 and part of the length of the second member 5 in the present embodiment.

While the steps of the method of the present embodiment are performs in order of the coating step, the assembling step, and the heating step, these steps may be performed in order of the assembling step, the coating step, and the heating step. More specifically, the first member may be disposed within the second member before the coating step. Subsequently, the foaming resin and the non-foaming resin are inserted into the space between the first member and the second member to be applied onto the first member, and then, the heating step is performed.

While the coating step is performed by a single stage in the present embodiment, the coating step may be performed through a plurality of stages. For example, the production method may be performed in this order: the coating step (first stage); the assembling step; the coating step (second stage); and heating step. For example, the first member is coated with only the non-foaming resin, and the first member coated with the non-foaming resin is inserted into the second member (assembling step). Then, the second stage of the coating step is performed to apply the foaming resin onto the first member, and subsequently the heating step is performed. Another step may be performed before, after, or between those steps. The order of, for example, the coating step, the assembling step, and the heating step includes the order of the first-stage coating step, the second-stage coating step, the assembling step, and the heating step.

The non-foaming resin is used as a non-foaming material in the present embodiment. The non-foaming material may be a metal, as will be described in a modification. Use of the non-foaming resin can prevent galvanic corrosion of the first member and the second member.

Advantages

Advantages of the metal-resin composite 1 and its production method according to the present embodiment will now be described. The production method of the metal-resin composite 1 includes the single-stage coating step of applying the foaming resin 3 and the non-foaming resin 4 onto part of the outer periphery 2s of the solid metal first member 2; the assembling step of disposing the first member 2 within the hollow metal first member 2, and the heating step of heating the first member 2 and the second member 5 with their axes extending in the horizontal direction, thereby foaming the foaming resin 3 between the first member 2 and the second member 5.

The space between the second member 5 and the first member 2 is filled with the foamed resin 3h and the non-foaming resin 4 in the heating step, and the non-foaming resin 4 acts as a spacer. Thus, the first member 2 is prevented from approaching the second member 5 downward so that a designed distance can be maintained between the second member 5 and the first member 2 even though the foaming resin is not cured and is soft. The production method of the embodiment thus allows the first member 2 (internal member) to be disposed in a desired position through some simple steps. Since the first member 2 and the second member 5 are prevented from coming into contact with each other, galvanic corrosion of the first member 2 (or the second member 5) can be prevented and the foamed resin 3h can exhibit a desired reinforcing ability as designed.

More specifically, the non-foaming resin 4 is applied at a thickness equal to the designed distance between the first member 2 and the second member 5 of the metal-resin composite 1 in the coating step because the thickness of the non-foaming resin 4 is not varied by heating. Thus, a designed positional relation is established between the first member 2 and the second member 5 (see FIGS. 1A and 1B). Also, by foaming the foaming resin 3 under the same conditions as the heating conditions for automotive electrodeposition coating, an electrodeposition coating step can be used as the heating step for foaming.

Figure 15A:
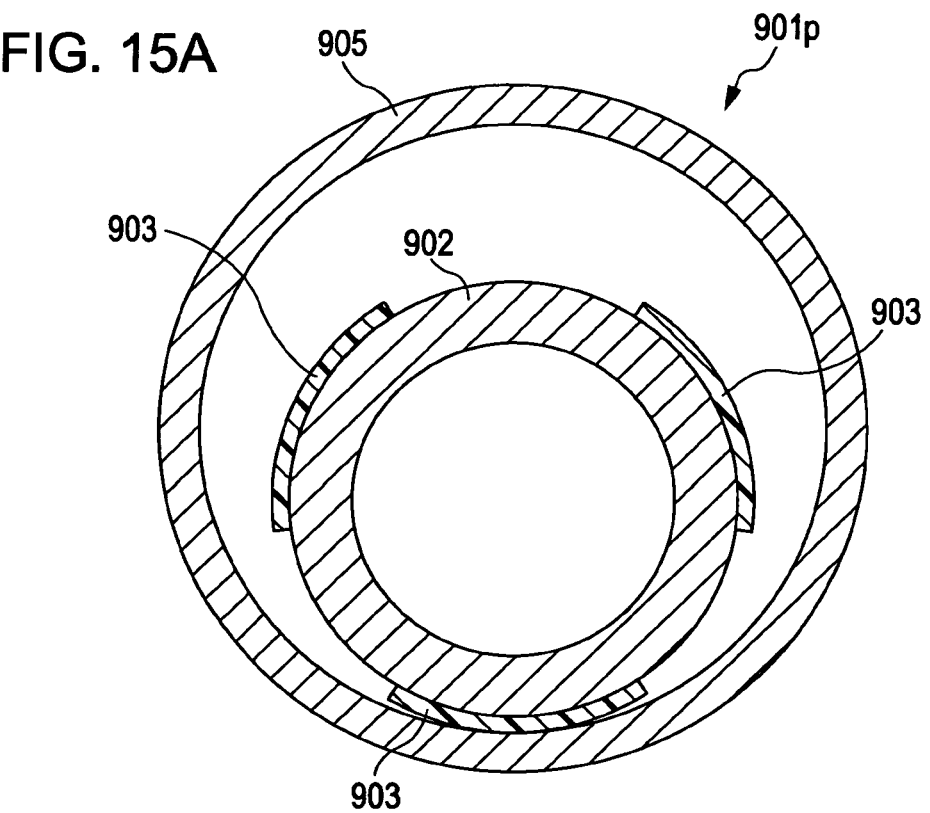
FIG. 15A is a schematic cross sectional view of the unheated assembly of a metal-resin composite according to a reference example.
Figure 15B:
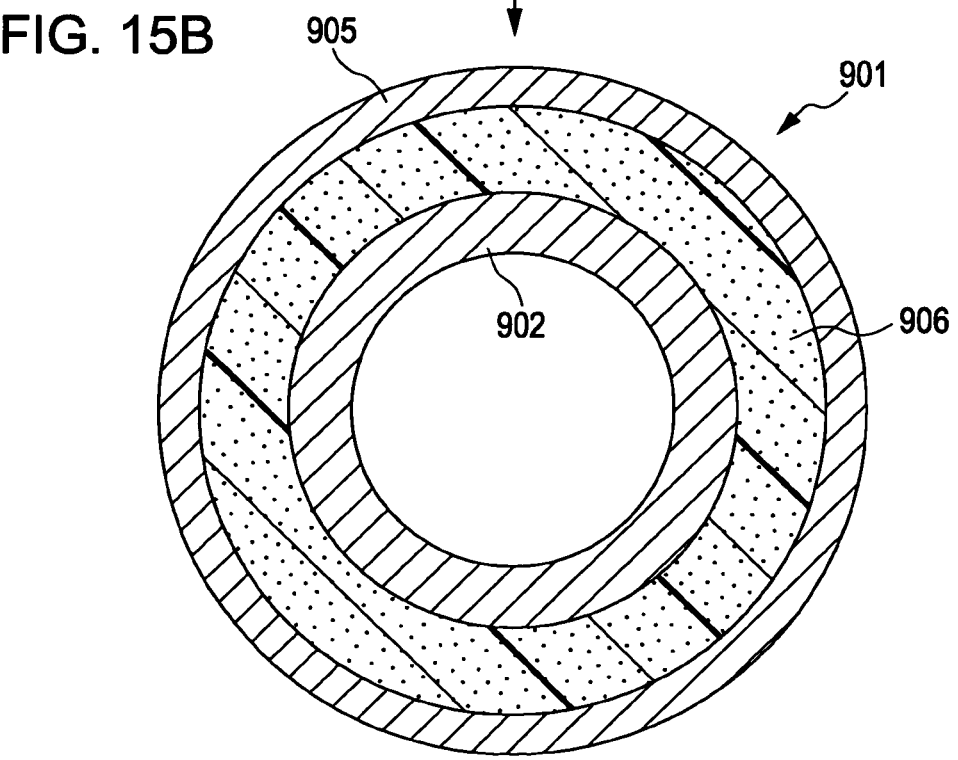
FIG. 15B is a schematic cross sectional view of the metal-resin composite during heating (or immediately after heating)
Figure 16:
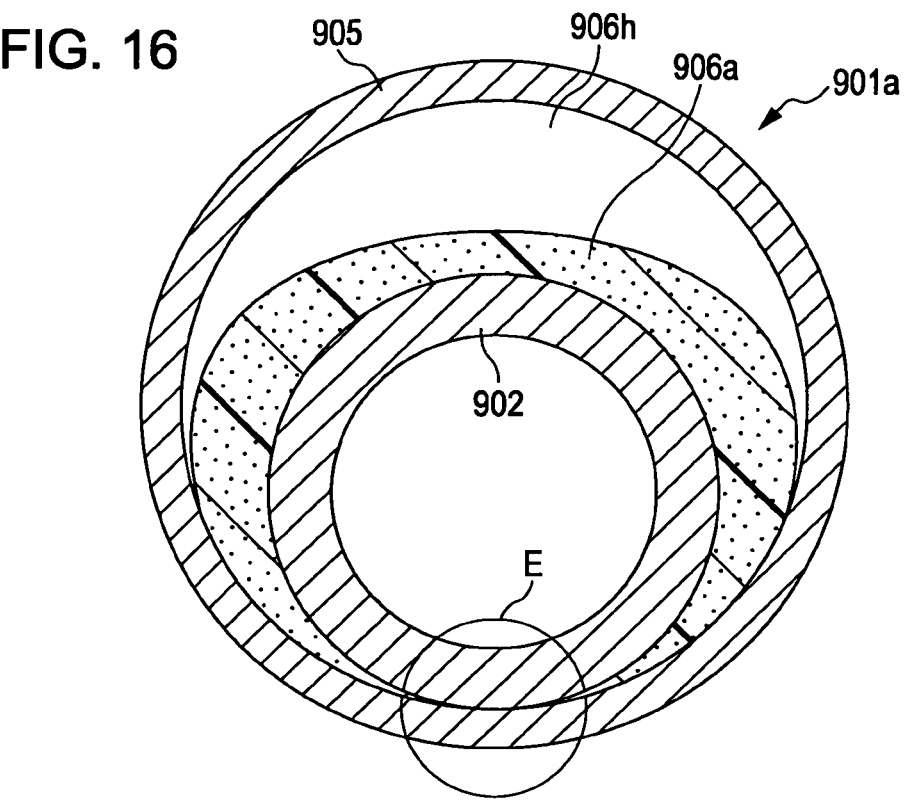
FIG. 16 is a schematic cross sectional view showing a state (first pattern) of the metal-resin composite of the reference example after a lapse of a time period from the state after heating shown in FIG. 15B.
Figure 17:
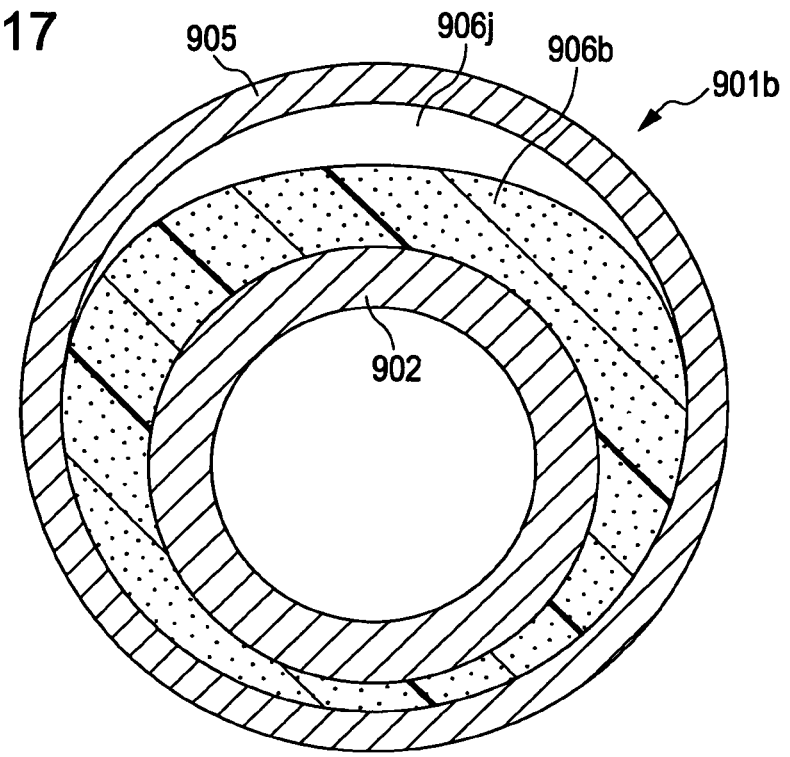
FIG. 17 is a schematic cross sectional view showing a state (second pattern) of the metal-resin composite of the reference example after a lapse of a time period from the state after heating shown in FIG. 15B.

The advantages of the production method of the metal-resin composite 1 according to the present embodiment will be further described in detail with reference to reference examples shown in FIGS. 15 to 17. FIGS. 15A to 17 illustrate a reference example different from the present embodiment. In the reference example, the unheated assembly 901p does not contain a non-foaming resin, and is heated to produce a metal-resin composite 901. FIGS. 15A and 15B show states of the metal-resin composite of the reference example before heating and during heating (or immediately after heating). FIG. 15A is a schematic cross sectional view of the unheated assembly, and FIG. 15B is a schematic cross sectional view of the metal-resin composite during heating (or immediately after heating). FIG. 16 is a schematic cross sectional view of a state (first pattern) of the metal-resin composite of the reference example after a lapse of a time period from the state after heating shown in FIG. 15B. FIG. 17 is a schematic cross sectional view of a state (second pattern) of the metal-resin composite of the reference example after a lapse of a time period from the state after heating shown in FIG. 15B. The portions designated by reference numerals 402s, 405s, and 406 in FIGS. 15A to 17 correspond to the parts designated by reference numerals 2s, 5s, and 6 in the embodiment, respectively.

The unheated assembly 901p of the reference example does not include a non-foaming resin, and the surface of the first member 902 is coated with only a foaming resin 903, as shown in FIG. 15A. Since the foaming resin is foamed to produce a force expanding the entire resin during heating, the internal first member 902 is supported in substantially the center in cross sectional view by the surrounding foamed resin (intermediate layer) 906 without falling into the resin during heating (and immediately after heating), as shown in FIG. 15B. After the completion of heating, however, a stage is present during natural cooling where the foaming is stopped and the resin has not yet been cured completely. In this stage, the first member 902 falls and is displaced from the intended position because of the softness of the resin and the contraction of foam gas.

FIGS. 16 and 17 show states (composites 901a and 901b) subsequent to the state shown in FIG. 15B, and are the first pattern and the second pattern, respectively. In FIG. 16, the intermediate layer 906 is deformed into the state designated by reference numeral 906a to bring the outer periphery of the first member 902 into contact with the inner periphery of the second member 905 at their lowermost positions, as shown in portion E in FIG. 16. In addition, a gap where the resin does not fill (or a low-density foamed portion) 906h is produced above the first member 902. In FIG. 17, the intermediate layer 906 is deformed into the state designated by reference numeral 906b to cause the first member 902 to fall, and, thus, a gap where the resin does not fill (or a low-density foamed portion) 906j is produced above the first member 902 though the outer periphery of the first member 902 does not come into contact with the inner periphery of the second member 905 at their lowermost positions.

When the heating step is performed for foaming without supporting the first member 902, the second member 905 and the first member 902 can come into contact with each other to cause galvanic corrosion. Also, a gap or a low-density foamed portion can be produced above the first member 902, and accordingly, the foamed resin (intermediate layer) 906, which should have a reinforcing ability to some extent, may not have a sufficient strength as designed. The production method of the present embodiment allows the first member 2 (internal member) to be disposed in a desired position through the above-described simple steps. Consequently, galvanic corrosion of the first member can be prevented when, for example, the first member is made of aluminum and the second member is made of steel, and the foamed resin 3h can exhibit a sufficient reinforcing ability as designed.

The production method of the embodiment does not require, for example, an additional positioning member for supporting the first second member at both ends, thus not increasing the number of parts for assembling. The positioning member cannot be used if the ends of the second member are closed. The production method of the embodiment allows the internal member or first member to be disposed in a desired position even in such a case.

In the heating step of the production method of the embodiment, at least part of the non-foaming resin 4 is disposed at the lowermost position between the first member 2 and the second member 5 so as to be sandwiched between the outer periphery 2t of the first member 2 and the inner periphery 5t of the second member 5. Hence, the non-foaming resin supports the first member (internal member) 2 upward at a position in cross sectional view. Thus, the internal member can be disposed in a desired position with a small amount of non-foaming resin through simple steps.

A non-foaming resin is used as the non-foaming material in the present embodiment. In use of, for example, an aluminum first member 2 and a steel second member 5 as in the present embodiment, the aluminum first member and the steel second member can cause galvanic corrosion if they are electrically continuous. If the non-foaming material is made of a metal, the first member and the second member can be brought into continuity. By disposing a non-foaming resin between the first member 2 and the second member 5, continuity between these members can be prevented, and, thus, the galvanic corrosion can be prevented between the first member 2 and the second member 5.

In the present embodiment, the first member 2 has a round hollow or solid shape and the second member 5 has a round hallow shape. By aligning the axes of the first member 2 and the second member 5 with each other as in the metal-resin composite 1 of the present embodiment, the first member 2 can be disposed within the second member 5 without leaning to one side in cross sectional view, as shown in FIGS. 1B and 7. Thus, the resulting metal-resin composite has a directionally independent strength.

In the present embodiment, the foaming resin 3 contains polyolefin, polyurethane, or polystyrene. These resins are considered to be most suitable from the viewpoint of the balance with the heating-foaming temperature of the chemical foaming agent, and any one of these resins can foam favorably.

The metal-resin composite 1 of the present embodiment includes a solid metal first member 2, a hollow metal second member 5 within which the first member 2 is disposed, and an intermediate layer 6 disposed between the first member 2 and the second member 5. The intermediate layer 6 is formed by heating an assembly of the second member 5 within which the first member 2 at least partially coated with a foaming resin 3 and a non-foaming resin 4 is disposed with the axes of the first member 2 and the second member 5 extending in the horizontal direction and thus foaming the foaming resin 3 between the first member 2 and the second member 5. The metal-resin composite thus includes the internal member or first member that has been disposed in a desired position through simple steps.

In the metal-resin composite 1 of the present embodiment, a foaming resin is used as the non-foaming material. Thus, galvanic corrosion can be prevented between the first member 2 and the second member 5.

Modifications

Modifications of the metal-resin composite according to the embodiment will now be described, concentrating on differences. The same parts in the drawings are designated by the same numerals and the description is not repeated.

Figure 8:
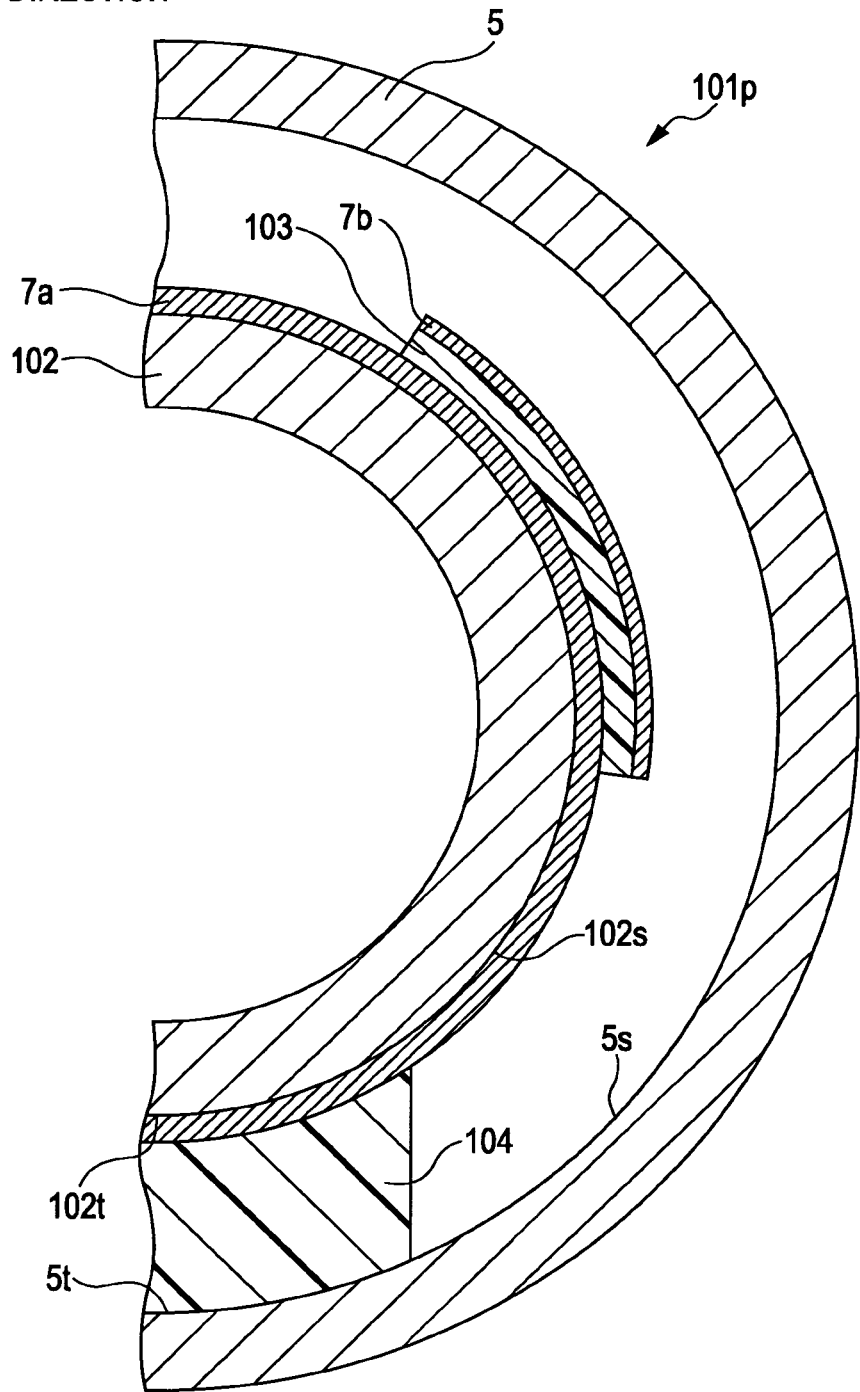
FIG. 8 is a schematic cross-sectional view taken in the diameter direction of the unheated assembly of a metal-resin composite according to a first modification of the embodiment.
Figure 9:
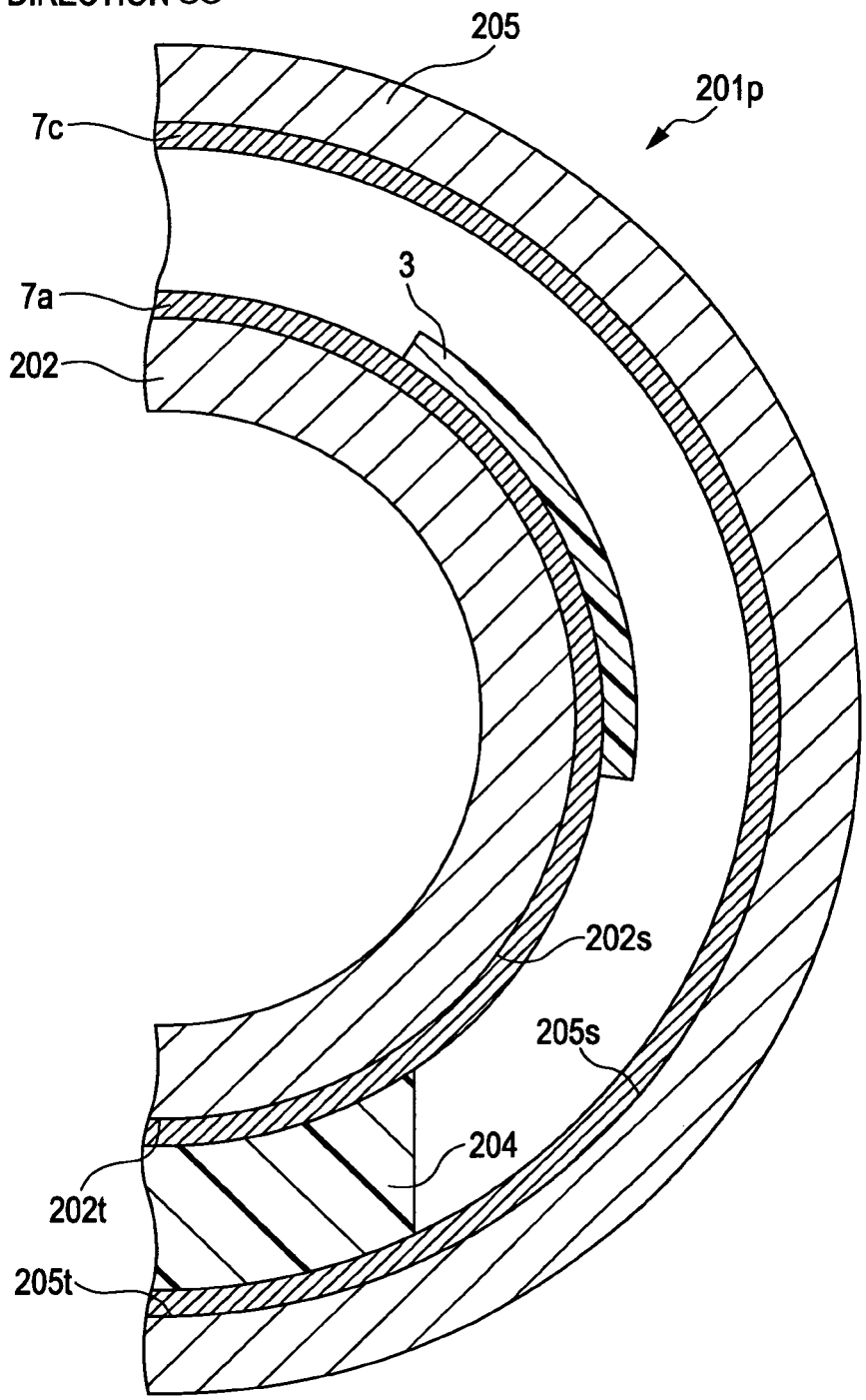
FIG. 9 is a schematic cross-sectional view taken in the diameter direction of the unheated assembly of a metal-resin composite according to a second modification of the embodiment.
Figure 10:
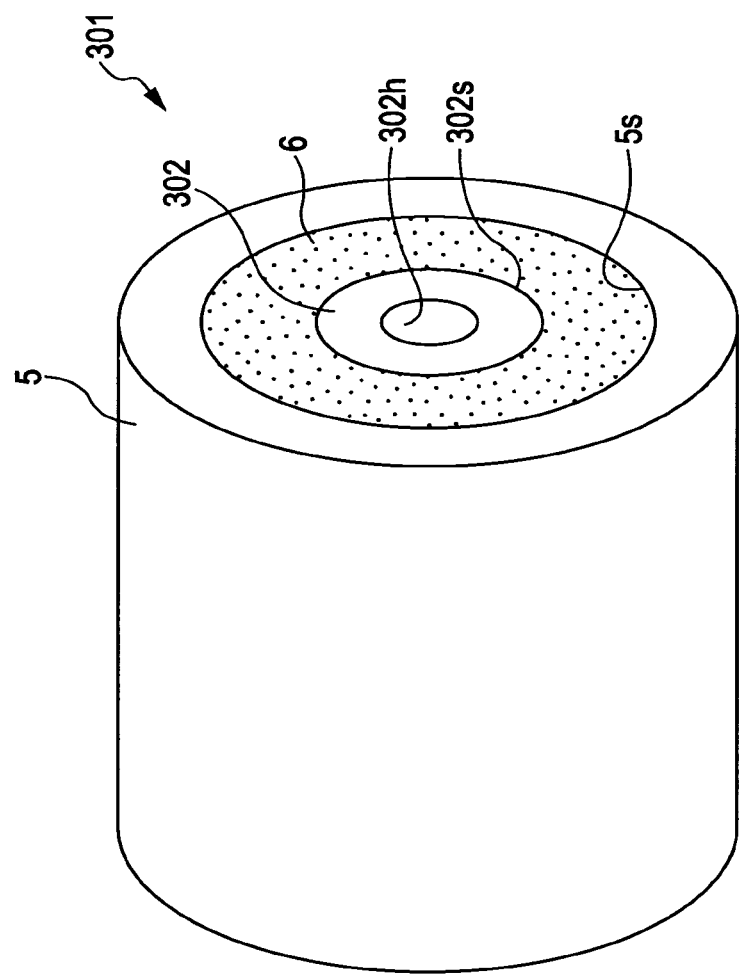
FIG. 10 is a schematic perspective view of a metal-resin composite according to a third modification of the embodiment.
Figure 11:
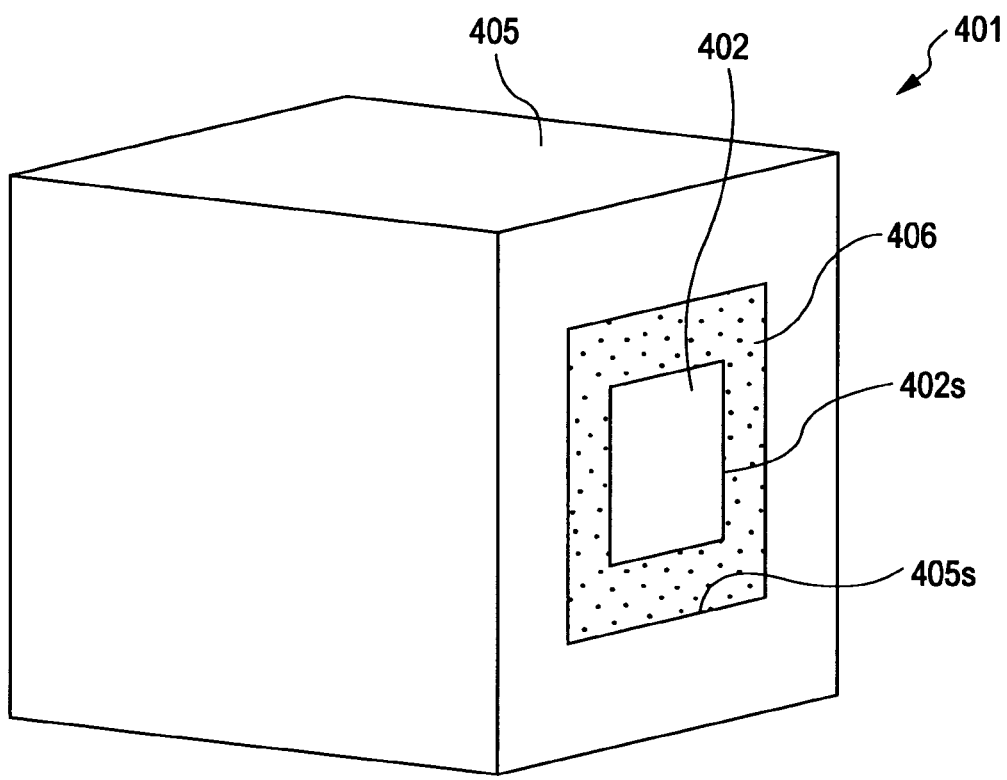
FIG. 11 is a schematic perspective view of a metal-resin composite according to a fourth modification of the embodiment.
Figure 12A:
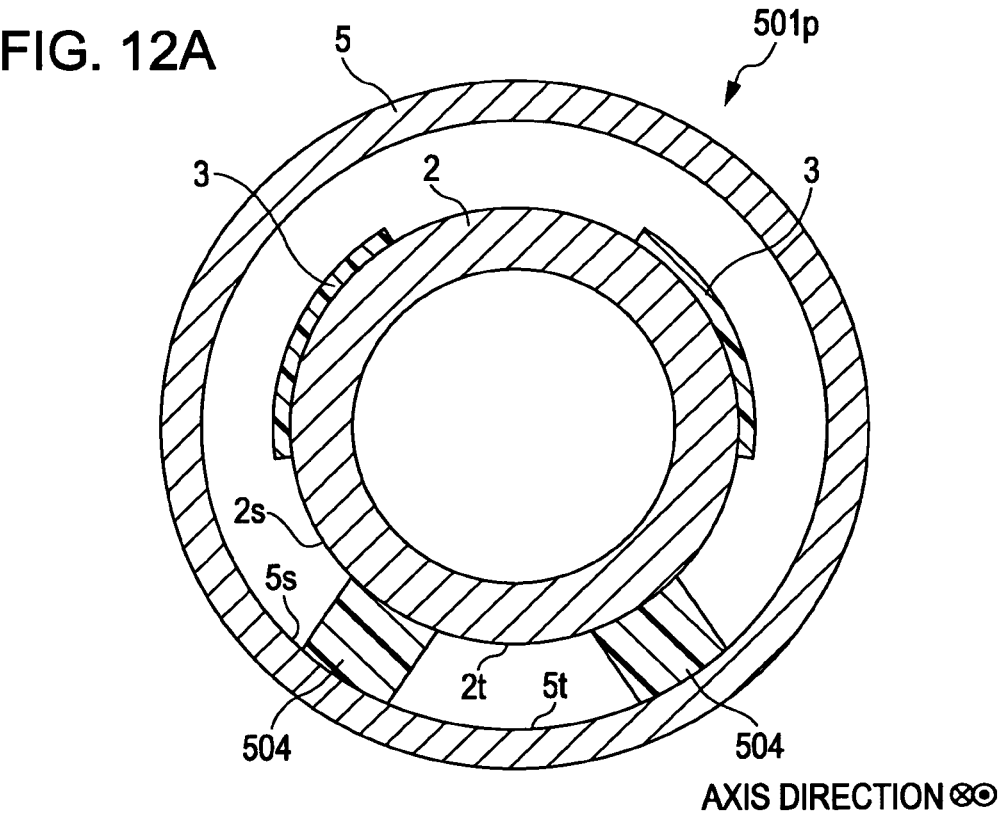
FIG. 12A is a schematic cross sectional view taken in the diameter direction of the unheated assembly of a metal-resin composite according to a fifth modification of the embodiment.
Figure 12B:
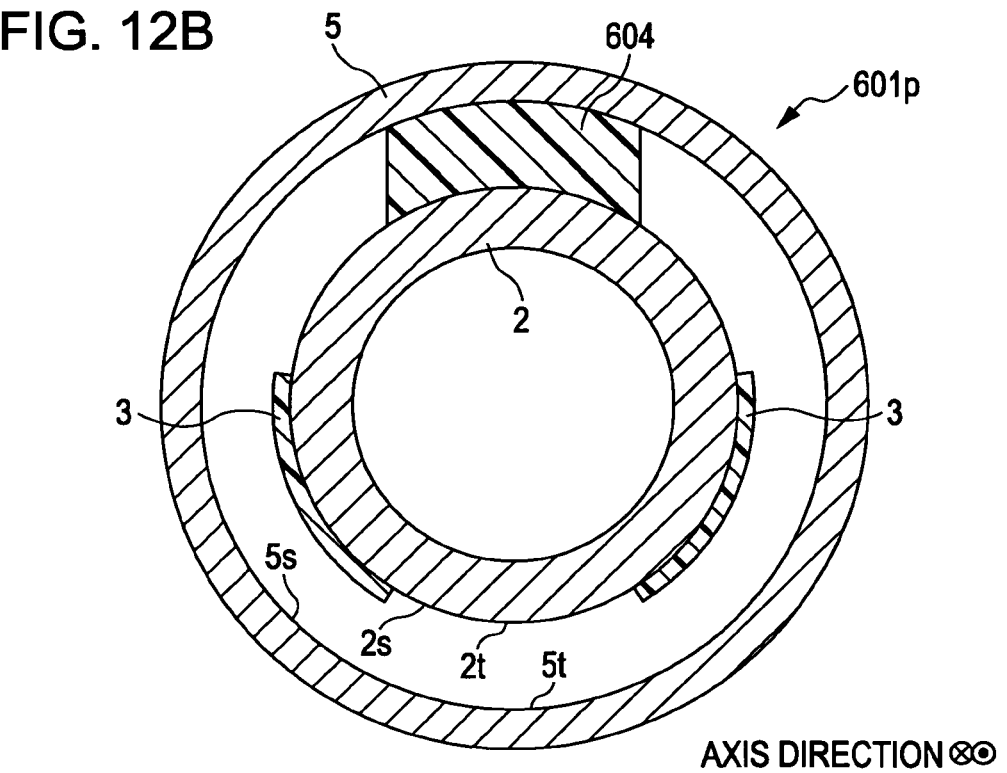
FIG. 12B is a schematic cross sectional view taken in the diameter direction of the unheated assembly of a metal-resin composite according to a sixth modification of the embodiment.
Figure 14A:
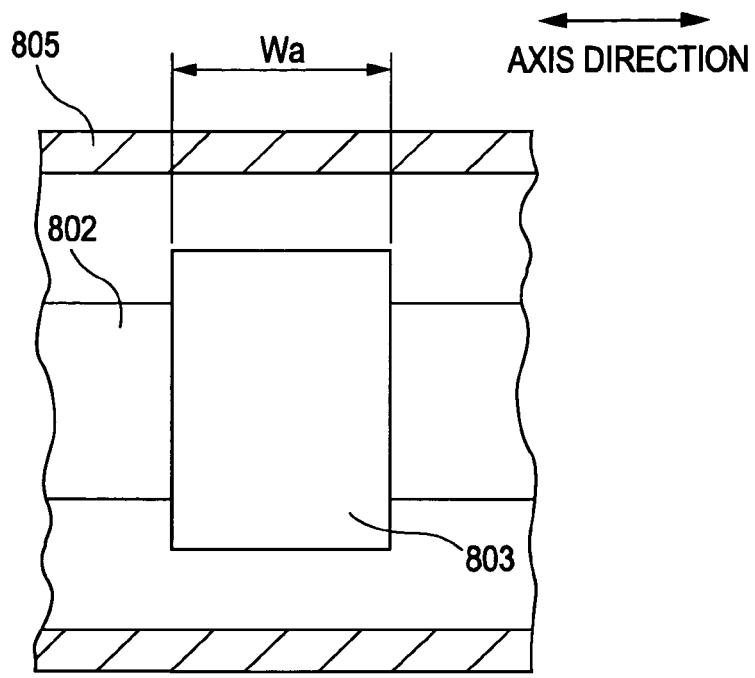
FIGS. 14A and 14B are schematic representations of the intervals between the portions of the foaming resin shown in FIG. 13.
Figure 14B:
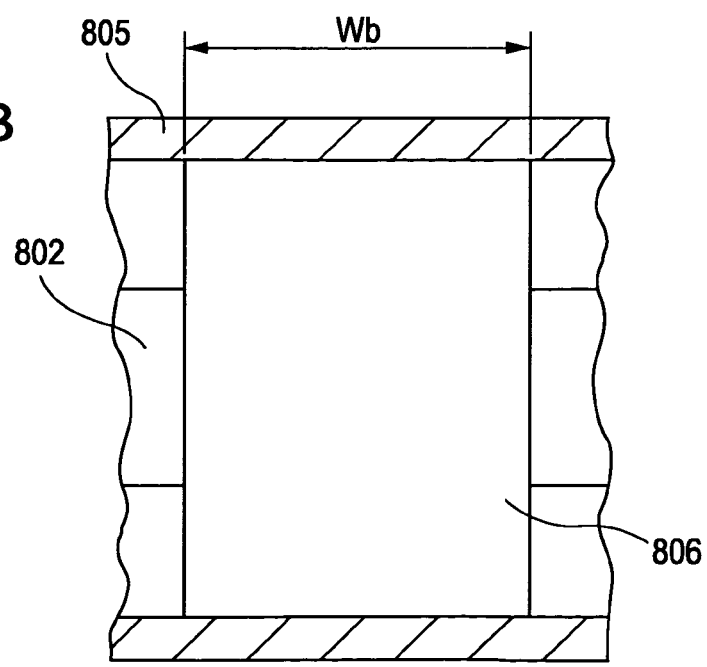
Figure 18A:
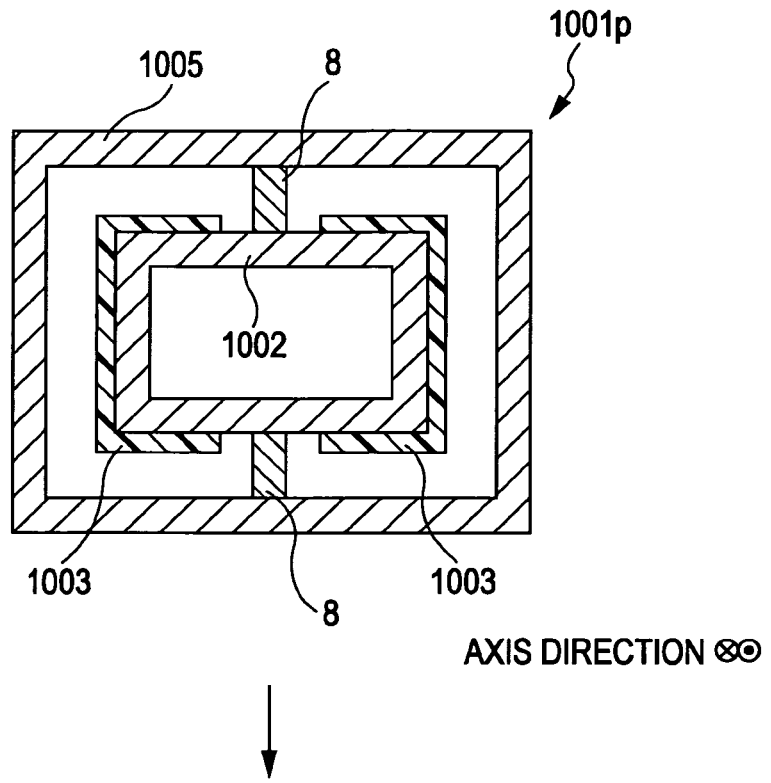
FIG. 18A is a schematic cross sectional view taken in the diameter direction of the unheated assembly of a metal-resin composite according to an eleventh modification.
Figure 18B:
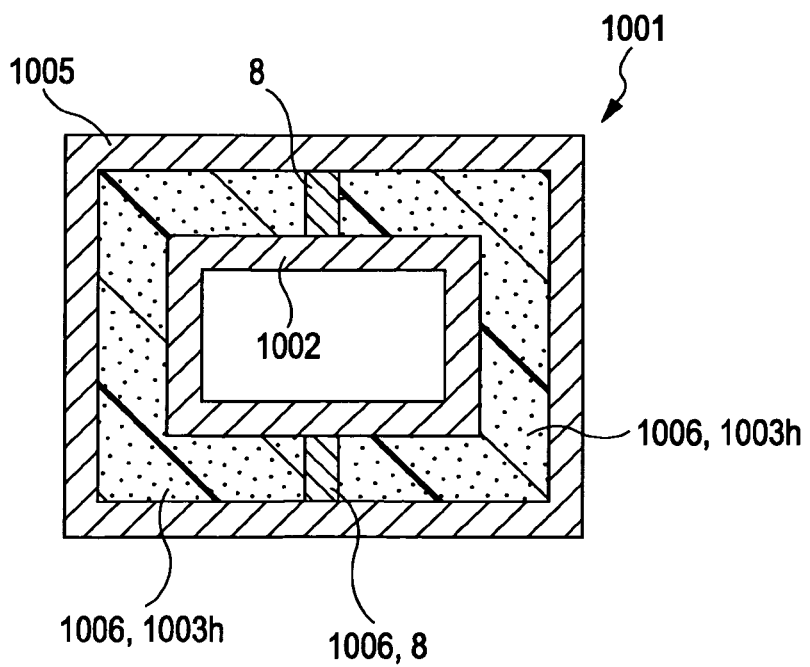
FIG. 18B is a schematic cross sectional view taken in the diameter direction of the metal-resin composite after heating according to an eleventh modification.
Figure 19A:
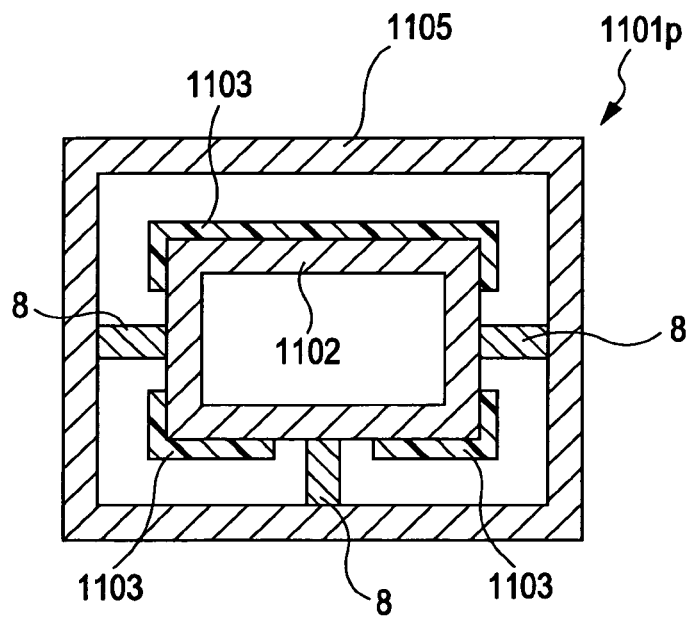
FIG. 19A is a schematic cross sectional view taken in the diameter direction of the unheated assembly of a metal-resin composite according to a twelfth modification.
Figure 19B:
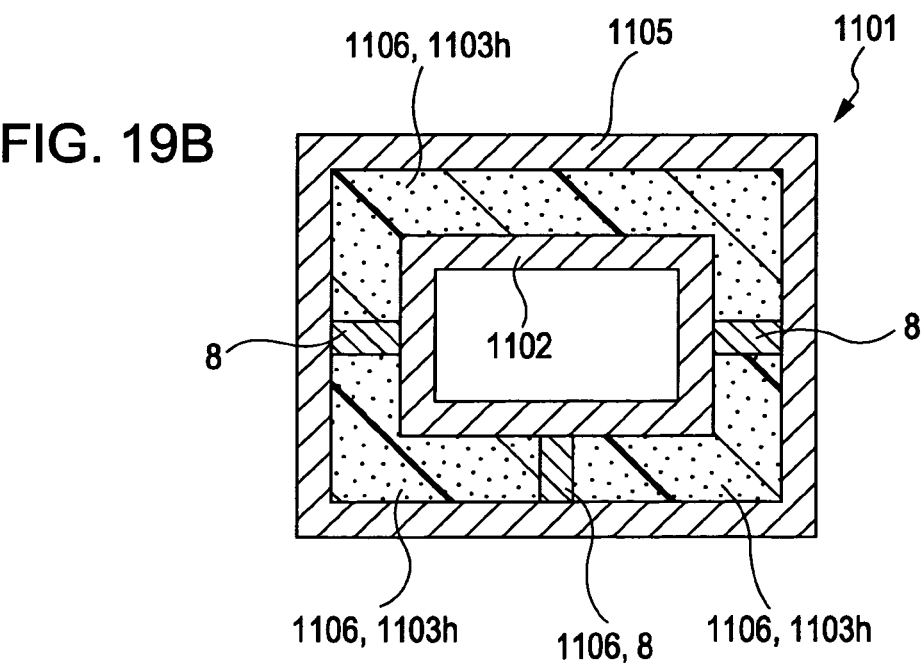
FIG. 19B is a schematic cross sectional view taken in the diameter direction of the metal-resin composite after heating according to the twelfth modification.
Figure 20A:
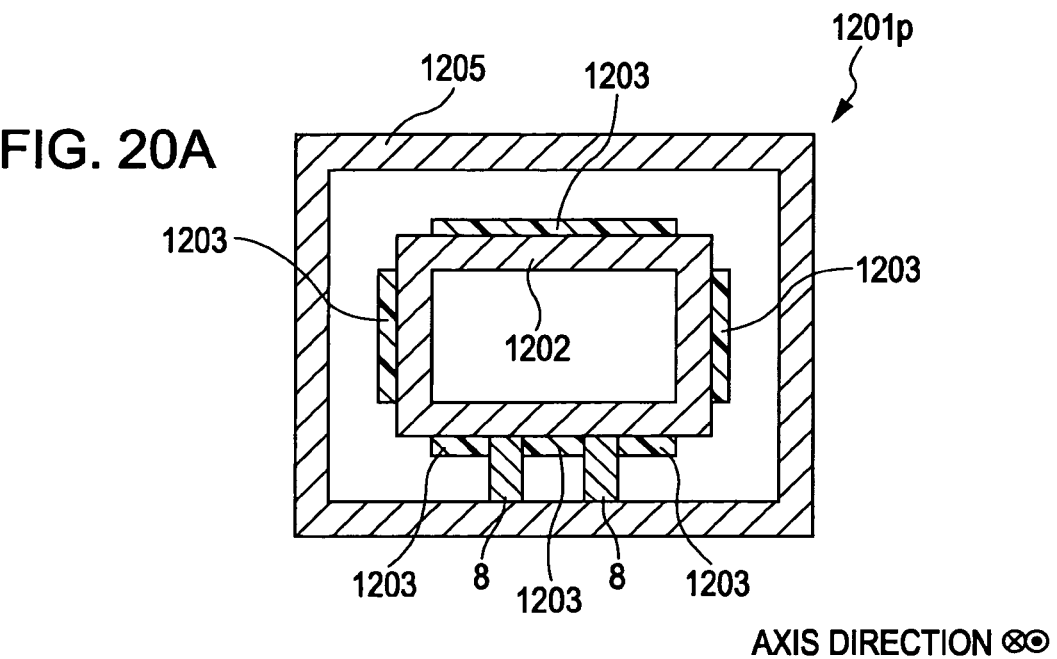
FIG. 20A is a schematic cross sectional view taken in the diameter direction of the unheated assembly of a metal-resin composite according to a thirteenth modification.
Figure 20B:
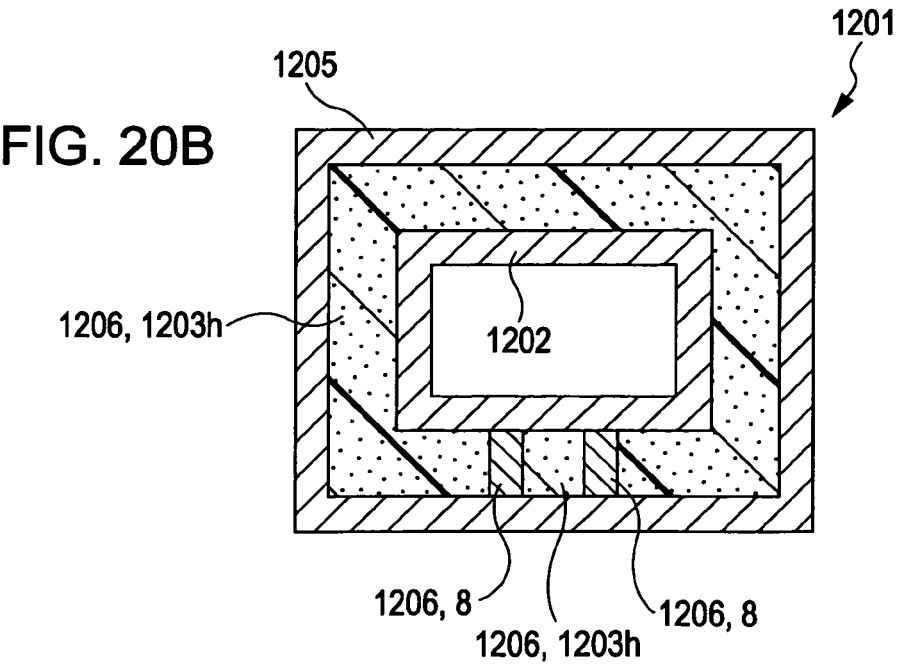
FIG. 20B is a schematic cross sectional view taken in the diameter direction of the metal-resin composite after heating according to the thirteenth modification.

FIG. 8 is a schematic cross sectional view of the unheated assembly of a metal-resin composite according to a first modification, and FIG. 9 is a schematic cross sectional view of the unheated assembly of a metal-resin composite according to a second modification. FIGS. 8 and 9 show enlarged portions corresponding to the portion surrounded by the dotted line (VIII, IX) in FIG. 1A. FIG. 10 is a schematic perspective view of a metal-resin composite according to a third modification, and FIG. 11 is a schematic perspective view of a metal-resin composite according to a fourth modification. FIG. 12A is a schematic cross sectional view of the unheated assembly of a metal-resin composite according to a fifth modification, and FIG. 12B is a schematic cross sectional view of the unheated assembly of a metal-resin composite according to a sixth modification. FIG. 13 is a schematic side view of the unheated assembly of a metal-resin composite according to a seventh modification, omitting the external second member. FIGS. 14A and 14B are schematic representations of the intervals between the portions of the foaming resin shown in FIG. 13: FIG. 14A shows a portion of the foaming resin before heating; and FIG. 14B shows the portion of the foaming resin after heating. FIG. 18A is a schematic cross sectional view of the unheated assembly of a metal-resin composite according to an eleventh modification, and FIG. 18B is a cross sectional view of the metal-resin composite according to the eleventh modification after heating. FIG. 19A is a cross sectional view of the unheated assembly of a metal-resin composite according to a twelfth modification, and FIG. 19B is a cross sectional view of the metal-resin composite according to the twelfth modification after heating. FIG. 20A is a cross sectional view of the unheated assembly of a metal-resin composite according to a thirteenth modification, and FIG. 20B is a cross sectional view of the metal-resin composite according to the thirteenth modification after heating.

First Modification

A metal-resin composite according to a first modification will first be described with reference to FIG. 8. The portions designated by reference numerals 102t and 104 in FIG. 8 correspond to the portions designated by reference numerals 2t and 4 in the above embodiment, respectively. FIG. 8 shows the unheated assembly 101p. In the first modification, the outer periphery 102s of the first member 102 is entirely coated with an adhesive layer 7a. Hence, the outer periphery 102s of the first member 102 is partially coated with a foaming resin 103 with the adhesive layer 7a in between in the coating step, as shown in FIG. 8. The adhesive layer 7a enhances the adhesion between the first member 102 and the intermediate layer. Consequently, a gap hardly occurs between the first member and the intermediate layer in the resulting product.

In addition, the surface of the foaming resin 3 coating the first member 102 (with the adhesive layer 7a in between) is also coated with an adhesive layer 7b, as shown in FIG. 8. This adhesive layer 7b enhances the adhesion between the second member 5 and the intermediate layer. Consequently, a gap hardly occurs between the second member and the intermediate layer in the resulting product.

In the first modification, the entire outer periphery 102s of the first member 102 is coated with an adhesive layer 7a. However, the adhesive layer 7a can be applied in any state without particular limitation as long as it is disposed between the first member and the foaming resin.

Second Modification

Turning now to FIG. 9, a metal-resin composite according to a second modification will be described. The portions designated by reference numerals 202, 202s, 202t, 204, and 205t in FIG. 9 correspond to the portions designated by reference numerals 2, 2s, 2t, 4, and 5t in the above embodiment, respectively. The production method of the metal-resin composite of the second modification further includes the step of applying an adhesive layer 7c onto the entire inner periphery 205s of the second member 205. FIG. 9 shows the unheated assembly 201p after the adhesive layer-applying step. Thus, the adhesion between the second member 205 and the intermediate layer is enhanced, and consequently, a gap hardly occurs between the second member and the intermediate layer in the resulting product.

In this instance, the production method of the metal-resin composite according to the second modification further include the adhesive-layer applying step, and the steps of coating, assembling, heating, and applying the adhesive layer may be performed in the following orders:

(1) adhesive layer-applying step, coating step, assembling step, and heating step (in the second modification);

(2) coating step, adhesive layer-applying step, assembling step, and heating step;

(3) adhesive layer-applying step, assembling step, coating step, and heating step;

(4) assembling step, adhesive layer-applying step, coating step, and heating step;

(5) adhesive layer-applying step, first-stage coating step, assembling step, second-stage coating step, and heating step;

(6) first-stage coating step, adhesive layer applying step, assembling step, second-stage coating step, and heating step; and (7) first-stage coating step, assembling step, adhesive layer applying step, second-stage coating step, and heating step.

Another step may be performed before, after, or between these steps.

In the second modification, the entire inner periphery 205s of the second member 205 is coated with the adhesive layer 7c in the adhesive layer-applying step. However, the adhesive layer 7c can be applied to part of the inner periphery of the second member, and is applied at least part of the inner periphery.

Third Modification

Turning now to FIG. 10, a metal-resin composite according to a third modification will be described. The portions designated by reference numeral 302h and 302s in FIG. 10 correspond to the portions designated by reference numeral 2s and 2h in the above embodiment. While the above embodiment uses a solid round first member, the third modification may use a hollow round first member 302 having a through hole 302h.

Fourth Embodiment

Turning now to FIG. 11, a metal-resin composite according to a fourth modification will be described. The portions designated by reference numerals 402s, 405s, and 406 in FIG. 11 correspond to the portions designated by reference numerals 2s, 5s, and 6 in the above embodiment, respectively. While the embodiment uses a solid round first member and a hollow round second member, the metal-resin composite 401 of the fourth modification may use a solid rectangular first member 402 and a hollow rectangular second member 405. Alternatively, the rectangular first member 402 may have a through hole and thus have a hollow rectangular shape (not shown). The first member and the second member having such simple shapes are easy to form.

Fifth and Sixth Modifications

Turning now to FIGS. 12A and 12B, metal-resin composites according to a fifth and a sixth modification will be described. The portions designated by reference numeral 501p, 504, 601p, and 604 in FIGS. 12A and 12B correspond to the portions designated by reference numerals 1p, 4, 1p, and 4 in the above embodiment, respectively. In the heating step of the embodiment, the non-foaming resin 4 is disposed in a region at the lowermost position between the first member 2 and the second member 5 so as to be sandwiched between the outer periphery 2t of the first member 2 and the inner periphery 5t of the second member 5 in the vertical direction. In the fifth modification shown in FIG. 12A, on the other hand, the position and state of the first member in the heating step is not limited to that in the embodiment, and two portions of the non-foaming resin 504 may be disposed in positions rotated by an angle (within 90 degrees) along the periphery in both directions from the lowermost position between the first member 2 and the second member 5 in cross sectional view. Thus, the internal first member 2 can be supported by the non-foaming resin from below, and consequently, the internal member can be disposed in a desired position through simple steps.

Alternatively, in the unheated assembly 601p of the sixth modification shown in FIG. 12B, the non-foaming resin 604 may be disposed in a region at the uppermost position between the first member 2 and the second member 5 so as to be sandwiched between the outer periphery of the first member 2 and the inner periphery of the second member 5 in the vertical direction. In this instance, the non-foaming resin 604 is bonded to the second member 5 and the first member 2 is bonded to the non-foaming resin 604. The first member 2 is thus hung from above. Also, the foaming resin 3 is applied to lower sides of the first member 2, in contrast to the above embodiment. Thus, the internal first member 2 can be held by the non-foaming resin, and consequently, the internal member can be disposed in a desired position through simple steps.

Seventh to Tenth Modifications

Turning now to FIG. 13, a seventh modification will be described. The portion designated by reference numeral 702s in FIG. 13 corresponds to the portion designated by reference numeral 2s in the above embodiment. Although the foaming resin is applied along the axis direction of the first member at substantially the same length as the first member in the coating step of the above embodiment, the foaming resin applied is not limited to the state of the embodiment. In the seventh modification, for example, a plurality of portions of the foaming resin 703, each having a smaller length in the axis direction than first member 702, are separately aligned in a line along the axis direction.

The portions of the foaming resin 703 are arranged at intervals of W1 in the axis direction. The interval W1 will be described with reference to FIGS. 14A and 14B. FIGS. 14A and 14B are schematic representations of a referential metal-resin composite including a hollow external second member 805, a solid internal first member 802, and a foaming resin 803 applied onto the first member 802. The referential composite is changed from the state shown in FIG. 14A to the state shown in FIG. 14B by heating. The foaming resin 803 is turned into a foamed resin 806 by heating. The length Wb of the foamed resin 806 in the axis direction is increased from the length Wa of the foaming resin 803. If the foaming resin 803 is foamed under the following conditions (1) to (4), the Wb/Wa ratio is expressed by equation 1.

(1) outer diameter of first member 802: 25 mm
(2) outer diameter of second member 805: 30 mm
(3) thickness of foaming resin 803: 1 mm
(4) expansion of foaming resin 803: 4 times $$Wb/Wa=1.5 \tag{1}$$

The interval W1 shown in FIG. 13 can be determined in view of the difference between the lengths of the foaming resin before foaming and the foamed resin after foaming. By appropriately setting the interval W1, the foaming resin can be foamed eliminating gaps in the foamed resin in the metal-resin composite after heating. In FIG. 14, the portions designated by reference numerals 802, 803, 805, and 806 correspond to the portions designated by reference numerals 2, 3, 5, and 6 in the above embodiment.

In an eighth modification, the foaming resin coating the first member contains foamable resin (in a state in which foaming is not completed and, accordingly, the resin can further be foamed). The foamable resin may be foamed in the heating step. Thus, the first member and the second member can be prevented more reliably from coming into contact with each other.

In a ninth modification, the foaming resin may contain an acid-modified polyolefin. The foaming resin containing an acid-modified polyolefin has a high affinity for metals. Consequently, the adhesive strength between the foamed resin and the first and second members is increased to prevent displacement.

In tenth modification, the foaming resin may contain organo-modified inorganic flake powder. The foaming resin containing organo-modified inorganic flake powder allows fine foaming and results in a strong foamed resin layer. Consequently, the adhesive strength between the foamed resin and the first and second members is increased to prevent displacement.

Eleventh Modification

Turning now to FIGS. 18A and 18B, a metal-resin composite according to an eleventh modification will be described. The portions designated by reference numerals 1003h and 1006 in FIGS. 18A and 18B correspond to the portions 3h and 6 in the embodiment. FIG. 18A shows the unheated assembly 1001p and FIG. 18B shows the metal-resin composite 1001 after heating. Two support members (non-foaming material) 8 for positioning are disposed on the upper surface and the lower surface of the first member 1002 in the eleventh modification. The support members 8 are integrally formed with the first member 1002 by extruding (extrusion), and are made of the same aluminum as the first member 1002. Thus, the first member 1002 and the support members 8 are extrusions. The first member 1002 is positioned with the support members 8 and is disposed around the center of the second member 1005, as shown in FIG. 18A. The first member 1002 is coated with a foaming resin 1003 so that a gap will not be formed between the first member 1002 and the second member 1005 after foaming. The metal-resin composite may have such a structure. While in the eleventh modification, the support members are integrated with the first member, the support members may be integrated with the second member. It is unnecessary to prepare additional non-foaming materials apart from the first member (or the second member). Thus, the number of parts can be reduced, and accordingly the unheated assembly can be prepared through simple steps. While the support members are integrally formed with the first member in the eleventh modification, the support members may be integrally formed with the second member.

In the production method of the metal-resin composite according to the eleventh modification, the coating step includes: (i) integrally forming the first member and the support members by extrusion; and (ii) disposing the foaming resin on the outer periphery of the first member (or the inner periphery of the second member).

Twelfth Modification

Turning now to FIGS. 19A and 19B, a metal-resin composite according to a twelfth modification will be described. The portions designated by reference numerals 1103h and 1106 in FIGS. 19A and 19B correspond to the portions designated by reference numerals 3h and 6 in the embodiment. FIG. 19A shows the unheated assembly 1101p and FIG. 19B shows the metal-resin composite 1101 after heating. In the twelfth modification, three support members (non-foaming material) 8 for positioning are disposed on both sides and the lower surface of the first member 1102. The support members 8 are integrally formed with the first member 1102 by extrusion. The first member 1102 is stably positioned with the support members 8 and is disposed around the center of the second member 1105, as shown in FIG. 19A. The first member 1102 is coated with a foaming resin 1103 so that a gap will not be formed between the first member 1102 and the second member 1105 after foaming. The metal-resin composite may have such a structure.

Thirteenth Modification

Turning now to FIGS. 20A and 20B, a metal-resin composite according to a thirteenth modification will be descried. The portions designated by reference numerals 1203h and 1206 in FIGS. 20A and 20B correspond to the portions designated by reference numeral 3h and 6 in the embodiment, respectively. FIG. 20A shows an unheated assembly 1201p and FIG. 20B shows a metal-resin composite 1201 after heating. In the thirteenth modification, two support members (non-foaming material) 8 for positioning are disposed on the lower surface of the first member 2. The support members 8 are integrally formed with the first member 1202 by extrusion. The first member 1202 is stably positioned with the support members 8 and is disposed around the center of the second member 1205, as shown in FIG. 20A. The first member 1202 is coated with a foaming resin 1203 so that a gap will not be formed between the first member 1202 and the second member 1205 after foaming. The metal-resin composite may have such a structure.

While the support members 8 and the first member are formed together by extrusion in the eleventh modification to the thirteenth modification, the support members 8 may be integrally formed with the second member by extrusion without being limited to those modifications. Alternatively, the support members (non-foaming material) 8 may be integrally welded or bonded to the upper surface, the lower surface, or both side of the first member to position the first member in advance as required. This facilitated the production of the metal-resin composite. The support members may be made of a non-foaming resin.

Examples

Examples of the metal-resin composite will now be described. Metal-resin composites were produced without using an adhesive layer between the metal members and the foaming resin, and the adhesion between the first member and the second member was inspected. The results are shown in the Table. In the table, "content" represents the content in the foaming resin. "Good" represents that the first member and the second member were not easily separated; "bad" represents the first member and the second member were easily separated from each other. Materials used in the examples are as follows:
(a) Matrix resin (polypropylene): F-744NP produced by Prime Polymer
(b) Maleic acid-modified polypropylene: U-mex (registered trademark) 1001 produced by Sanyo Chemical Industries
(c) Organo-modified montmorillonite: S-BEN (registered trademark) NX produced by Hojun
(d) Foaming agent: azodicarbonamide (ADCA) AC#R produced by Eiwa chemical

TABLE

| | Matrix resin (polypropylene) | Maleic acid-modified polypropylene | Organo-modified montmorillonite | Foaming agent | Adhesion |
|---|---|---|---|---|---|
| (1) | 83.6 | 10.4 | 5.0 | 1 | Excellent |
| (2) | 88.3 | 10.4 | 0 | 1 | Good |
| (3) | 99 | 0 | 0 | 1 | Fair |

Content (wt %)

In the Table, (1) and (2) represent Examples 1 and 2 of the metal-resin composite using a foaming resin containing maleic acid-modified polypropylene as an acid-modified polyolefin (corresponding to the ninth modification). The foaming resin of Example 1 further contains an organo-modified inorganic flake powder (corresponding to the tenth modification). In the Table, (3) represents Example 3 of the metal-resin composite using a foaming resin not containing an acid-modified polyolefin or an organo-modified inorganic flake powder (corresponding to the embodiment).

As shown in (2) in Table, a foaming resin containing an acid-modified polyolefin, maleic acid-modified polypropylene, enhances the adhesion in comparison with a foaming resin not containing an acid-modified polyolefin. As shown in (1) in Table, a foaming resin further containing organo-modified inorganic flake powder further enhances the adhesion in comparison with foaming resins not containing the organo-modified inorganic flake powder.

While the present invention has been described using an exemplary embodiment and its modifications, the invention is not limited to the disclosed embodiment or modifications, and various modifications may be made without departing from the scope and sprit of the invention.

While the metal-resin composite of the above embodiment is used as an automotive door beam, the metal-resin composite of the invention may be used as a sound absorbable drainpipe and others without particular limitation. Also, the dimensions of each member and the positions of the foaming resin and the non-foaming resin can be arbitrarily changed.

What is claimed is:

1. A method for producing a metal-resin composite, comprising the steps of:
    coating at least part of a first member by a foamable resin and a non-foamable resin of a desired thickness, the first member being the outer periphery of a hollow or solid metal, the coating step being performed in at least one step;
    disposing the first member within a hollow metal second member;
    heating an assembly of the second member within which the first member coated with the foamable resin and the non-foamable resin is disposed with the axes of the first member and the second member extending in the horizontal direction, thereby foaming the foamable resin between the first member and the second member, to form the metal-resin composite,
    wherein the desired thickness of non-foamable resin is equal to a distance between the hollow second member and the first member in the formed metal-resin composite.

2. The method according to claim 1, wherein the step of heating is performed in a state in which at least part of the non-foamable resin is sandwiched between the lowermost position of the outer periphery of the first member and the lowermost position of the inner periphery of the second member in the vertical direction.

3. The method according to claim 1, wherein at least part of the outer periphery of the first member is coated with an adhesive layer, and the step of coating is performed so that the adhesive layer is disposed between the first member and the foamable resin.

4. The method according to claim 1, wherein the step of coating includes the sub step of forming an adhesive layer on the surface of the foamable resin coating the first member.

5. The method according to claim 1, further comprising the step of forming an adhesive layer to coat at least part of the inner periphery of the second member.

6. The method according to claim 1, wherein the foamable resin is foamed in the step of heating.

7. The method according to claim 1, wherein the first member has a round hollow or solid shape, and the second member has a round hollow shape.

8. The method according to claim 1, wherein the first member has a hollow or solid prismatic shape, and the second member has a hollow prismatic shape.

9. The method according to claim 1, wherein the foamable resin contains any one of polyolefin, polyurethane or polystyrene.

10. The method according to claim 1, wherein the foamable resin contains an acid-modified polyolefin.

11. The method according to claim 1, wherein the foamable resin contains organo-modified inorganic flake powder.

12. The method of claim 1, wherein the coating at least part of the outer periphery of the hollow or solid metal first member with the non-foamable resin comprises coating a first portion and a second portion of the first member in which the two portions are aligned in an axial direction along the first member such that one of the two portions covers the other when viewed in the axial direction.

* * * * *